US006215222B1

(12) United States Patent
Hoen

(10) Patent No.: US 6,215,222 B1
(45) Date of Patent: Apr. 10, 2001

(54) OPTICAL CROSS-CONNECT SWITCH USING ELECTROSTATIC SURFACE ACTUATORS

(75) Inventor: Storrs T. Hoen, Brisbane, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/281,698

(22) Filed: Mar. 30, 1999

(51) Int. Cl.⁷ .............................. G02B 26/08; H02N 1/00

(52) U.S. Cl. ............................................. 310/309

(58) Field of Search ............................................. 310/309

(56) References Cited

U.S. PATENT DOCUMENTS

| 4,065,677 | 12/1977 | Micheron et al. | 307/112 |
|---|---|---|---|
| 4,288,788 | * 9/1981 | Rogers et al. | 340/378.2 |
| 5,042,889 | 8/1991 | Benzoni | 385/16 |
| 5,208,880 | 5/1993 | Riza et al. | 385/18 |
| 5,378,954 | 1/1995 | Higuchi et al. | 310/309 |
| 5,408,355 | 4/1995 | Rauch et al. | 359/298 |
| 5,554,851 | * 9/1996 | Hirai et al. | 310/309 |
| 5,960,132 | 9/1999 | Lin | 385/18 |
| 5,969,465 | * 10/1999 | Neukermans et al. | 310/333 |
| 5,969,848 | 10/1999 | Lee et al. | 359/298 |
| 5,986,381 | * 11/1999 | Hoen et al. | 310/309 |

FOREIGN PATENT DOCUMENTS

| 6-337953 | * 12/1994 | (JP) | 310/309 |
|---|---|---|---|
| 7-304208 | * 11/1995 | (JP) | 310/309 |

OTHER PUBLICATIONS

Yassenn, A. A. et al., "A Rotary Electrostatic Micromotor 1=8 Optical Switch", IEEE Workshop of Micro Electro Mechanical System, Jan. 25, 1998, pp. 116–120.

* cited by examiner

Primary Examiner—Thomas M. Dougherty

(57) ABSTRACT

A system and a method of steering optical beams utilize a surface electrostatic actuator to mechanically pivot a micromirror to selectively redirect a received optical beam to a predetermined destination. In a preferred application, the system is an optical switch that can optically couple a number of first optical fibers to a number of second optical fibers in one of many configurations. As an optical switch, the system includes a number of switching devices that operate to couple the optical fibers. Each switching device includes a surface electrostatic actuator and a micromirror to reflect a received optical signal to a selected optical fiber. The electrostatic actuator includes a translator and a stator that are separated by a short distance. The opposing surfaces of the translator and stator include a number of drive electrodes. These electrodes generate electrostatic forces between the translator and the stator. The translator is laterally displaced when the electrostatic forces are modified. The modification of the electrostatic forces is accomplished by reconfiguring a voltage pattern of the drive electrodes on the translator and/or the stator. The lateral displacement of the translator pivots the micromirror, which is mechanically attached to the translator. Pivoting the micromirror from a non-reflective orientation to a reflective orientation equates to activating the switching device. When activated, the micromirror of the switching device reflects the received optical signal to the selected optical fiber. In the preferred embodiment, the translator and the stator further include levitator electrodes that generate repulsive forces to negate any attractive forces between the translator and the stator.

25 Claims, 19 Drawing Sheets

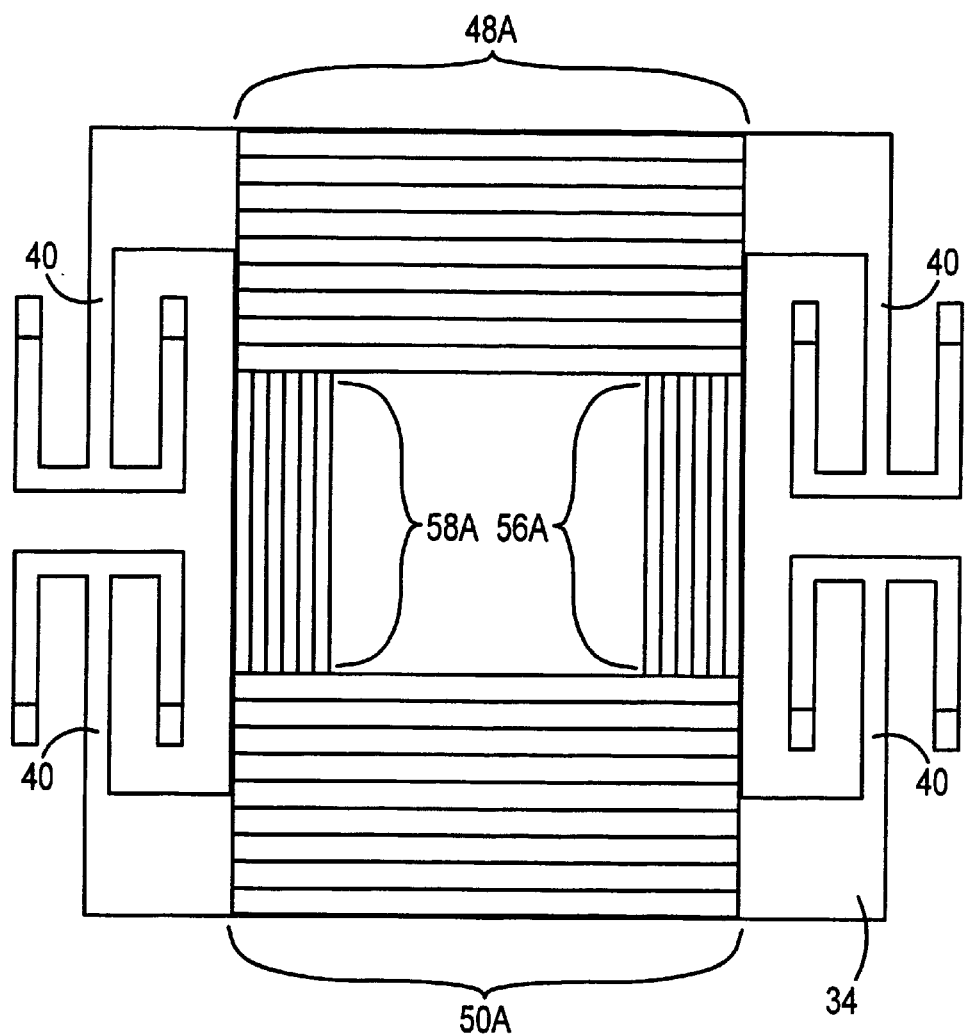
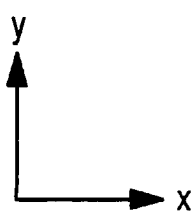
FIG. 7

OPTICAL CROSS-CONNECT SWITCH USING ELECTROSTATIC SURFACE ACTUATORS

TECHNICAL FIELD

The invention relates generally to optical switches and more particularly to an optical switch having micromachine-actuated mirrors.

DESCRIPTION OF THE RELATED ART

Continuing innovations in the field of fiber optic technology have contributed to the increasing number of applications of optical fibers in different technologies. With the increased utilization of optical fibers, there is a need for efficient peripheral devices that assist in the transmission of data through these optical fibers, such as optical switches. An optical switch operates to selectively couple an optical fiber to one of two or more alternative optical fibers such that the two coupled optical fibers are in communication with each other.

The coupling of the optical fibers performed by an optical switch can be effectuated through various methods. One method of interest includes using a mirror that is placed in front of an input optical fiber to reflect optical signals from the input optical fiber to at least one of two output optical fibers. The input and output optical fibers may be either uni-directional or bi-directional fibers. In the simplest implementation of the mirror method, the input optical fiber is aligned with one of two output optical fibers, such that when the mirror is not placed in an optical path between these two aligned optical fibers, the two aligned optical fibers are in a communicating state. However, when the mirror is placed between the two aligned optical fibers, the mirror steers, i.e., reflects, optical signals from the input optical fiber to the other output optical fiber. The positioning of the mirror in and out of the optical path between the two aligned optical fibers can be accomplished by using an apparatus that mechanically moves the mirror to a desired position.

U.S. Pat. No. 5,208,880 to Riza et al. describes an optical switch that utilizes a piezoelectric actuator to displace a mirror to selectively couple an input optical fiber to a particular output optical signal. The piezoelectric actuator of Riza et al. includes a number of piezoelectric bars, also known as unimorphs, to linearly displace the mirror. In a first embodiment, the optical switch of Riza et al. includes N output optical fibers that are positioned perpendicularly to an input optical fiber in a side-by-side configuration. The mirror is positioned on the axis of the input optical fiber and has a reflective surface that is orientated to direct optical signals from the input optical fiber at a right angle. The mirror is coupled to the piezoelectric actuator that is able to displace the mirror along the axis of the input optical fiber to couple the input optical fiber to any one of the output optical fibers. In operation, the piezoelectric actuator linearly displaces the mirror to a location where the axis of the input optical fiber intersects an axis of a preselected output optical fiber. The mirror at the intersecting location reflects optical signals from the input optical to the preselected output optical fiber and reflects optical signals from the preselected output optical fiber to the input optical fiber. The input optical fiber can be optically coupled to another output optical fiber by linearly displacing the mirror to a new location, where the axis of the input optical fiber intersects an axis of the to-be-coupled output optical fiber.

In a second embodiment, the optical switch of Riza et al. is configured to accommodate two input optical fibers and two output optical fibers. The optical fibers are positioned in an "X" configuration such that two output optical fibers are located in the upper portion of the configuration and the two input optical fibers are located in the lower portion of the configuration. In this embodiment, the optical switch of Riza et al. includes a thin mirror that has reflective surfaces on both sides. The mirror can be positioned in the optical paths between the optical fibers by the piezoelectric actuator such that when the mirror is displaced to the center of the "X" configuration, the lower left optical fiber is coupled to the upper left optical fiber and the lower right optical fiber is coupled to the upper right optical fiber (the "reflective state"). However, when the mirror is removed from the optical paths, the lower left optical fiber is coupled to the upper right optical fiber and the lower right optical fiber is coupled to the upper left optical fiber (the "passive state").

U.S. Pat. No. 5,042,889 to Benzoni describes an optical switch that also uses a mirror to switch optical paths between optical fibers. In an exemplary embodiment, the optical switch of Benzoni is configured to accommodate four optical fibers that are positioned in the above-described "X" configuration. In contrast to the optical switch of Riza et al., the optical switch of Benzoni utilizes an electromagnetic mechanism, instead of a piezoelectric actuator, to move the mirror in and out of the optical paths between the optical fibers. The electromagnetic mechanism operates to create an attractive magnetic force between the mechanism and the mirror. The upper section of the mirror includes a ferromagnetic material that becomes attracted to the electromagnetic mechanism when the magnetic force is generated. The electromagnetic mechanism is located above the mirror to lift the mirror when the mechanism is activated. Initially, the mirror is positioned between the optical paths such that the four optical fibers are coupled in the reflective state. When the electromagnetic mechanism is activated, the attractive magnetic force causes the mirror to be lifted out of the optical paths to set the optical fibers in the passive state.

Although the known optical switches operate well for their intended purpose, what is needed is an optical switch that includes a compact actuator to precisely position an associated mirror using low operating voltage, so that the actuator is compatible with complementary metal-oxide semiconductor (CMOS) circuitry.

SUMMARY OF THE INVENTION

A system and a method of steering optical beams utilize a surface electrostatic actuator to mechanically pivot a micromirror to selectively redirect a received optical beam to a predetermined direction. In a preferred application, the system is an optical switch that can optically couple a number of first optical fibers to a number of second optical fibers in one of many configurations. The electrostatic actuator and the micromirror form a switching device of the optical switch to redirect optical signals between two optical fibers such that the two optical fibers are in communication.

In an exemplary embodiment, the optical switch includes sixteen switching devices in a 4×4 arrangement. The optical switch is connected to a first set of four optical fibers that are positioned on the first side of the optical switch. The optical switch is also connected to a second set of four optical fibers that are positioned on a second side of the optical switch, which is perpendicular to the first side of the optical switch. The optical fibers of the first and second set are situated above the upper surface of the optical switch and have axes that are generally parallel to the upper surface of the optical switch. Each switching device of the optical switch is positioned between the first set of optical fibers and the second set of optical fibers such that when activated, a predefined optical fiber of the first set is optically coupled to a corresponding optical fiber of the second set. In this embodiment, each optical fiber of the first set can be optically coupled to a distinct optical fiber of the second set by selectively activating four switching devices. The coupling configuration of the optical fibers can be changed by deactivating one or more of the activated switching devices and activating a corresponding number of the non-activated switching devices in a predetermined manner, so that four switching devices are again activated.

The optical coupling of the optical fibers is accomplished by pivoting the micromirror from a non-reflective orientation to a reflective orientation. The non-reflective orientation is the position of the micromirror in which the reflecting surface of the micromirror is generally parallel to the upper surface of the optical switch. When the micromirror is in the non-reflective orientation, any optical signal that propagates through the switching device is allowed to continue propagation in the original direction. The reflective orientation is the position of the micromirror in which the reflecting surface of the micromirror is perpendicular to the upper surface of the optical switch. In this orientation, the micromirror reflects any optical signal that propagates through the switching device, thereby optically coupling two optical fibers that have axes that intersect at the location of the micromirror.

Each switching device includes the pivotable micromirror and the surface electrostatic actuator. The electrostatic actuator includes a stator and translator. The translator and the stator are separated by a short distance and are in an orientation such that the lower surface of the translator faces the upper surface of the stator. The translator is configured to include a number of flexures that are attached to translator supports. The translator supports are affixed to the upper surface of the stator. Therefore, the translator is physically attached to the stator by the translator supports. However, the flexures of the translator allow the translator to be displaced laterally, i.e., in the direction parallel to the upper surface of the stator.

The micromirror is also attached to the upper surface of the stator in a manner to allow the micromirror to be pivoted between the non-reflective orientation and the reflective orientation. In addition, the micromirror is mechanically attached to the translator. The mechanical connection of the micromirror and the translator permits the micromirror to be pivoted when the translator is laterally displaced. When the translator is in a default location, the micromirror is in the non-reflective orientation. However, when the translator is laterally displaced by a predefined length, the micromirror is pivoted to the reflective orientation.

The opposing surfaces of the translator and the stator include electrodes that generate electrostatic forces to laterally displace the translator. The electrodes are thin strips of conductive materials that are aligned in a parallel fashion. The translator includes a first set of drive electrodes that are located on the lower surface of the translator. These electrodes are positioned on the lower surface of the translator such that the lengths of the electrodes are perpendicular to the travel direction of the translator. The stator includes a second set of drive electrodes that are located on the upper surface of the stator. The second set of drive electrodes are positioned on the stator with the lengths of these electrodes also being perpendicular to the travel direction of the translator. The number of drive electrodes in the first and second set is not critical to the invention.

The drive electrodes are electrically coupled to one or more voltage sources that are used to provide an adjustable pattern of voltages to at least one set of drive electrodes in order to change the electrostatic forces that are generated between the sets of drive electrodes. As an example, the first set of drive electrodes may be electrically connected to a voltage source that provides a fixed pattern of voltages to the electrodes. In this example, the second set of drive electrodes may be electrically connected to a microcontroller that contains a voltage source. The microcontroller operates to provide voltages to the second set of drive electrodes in a predetermined voltage pattern. However, the microcontroller is able to reconfigure the voltage pattern by selectively applying different voltages to some of the drive electrodes of the second set. The reconfiguration of the voltage pattern modifies the electrostatic forces between the translator and stator, thereby laterally displacing the translator. The translator is further displaced by changing the reconfigured voltage pattern to another voltage pattern.

There are a number of voltage pattern sequences that may be utilized to laterally displace the translator. As an example, the fixed voltage pattern on the first set of drive electrodes is an alternating pattern of five and zero volts and the pitch of the second set of drive electrodes is slightly smaller than the pitch of the first set of drive electrodes, so that there are approximately seven electrodes in the second set of drive electrodes for every six electrodes in the first set of drive electrodes. In this example, the initial voltage pattern on the second set of drive electrodes may be a repeating "5050550" pattern, wherein "5" represents positive five volts and "0" represents zero volts. Next, the voltage pattern on the second set of drive electrodes is changed to a repeating "5050500" pattern. The new voltage pattern will change the electrostatic forces generated by the initial voltage pattern. The change in the electrostatic forces laterally displaces the translator to the left. To further displace the translator, the voltage pattern is reconfigured once again to a repeating "5050505" pattern. The voltage pattern sequence of this above example involves switching every seventh drive electrode from five volts to zero volts or from zero volts to five volts. The drive electrodes that are switched are the drive electrodes that are positioned to the immediate right of the electrodes that were previously switched. In this fashion, the translator is displaced to the left from the default position of the translator.

In the preferred embodiment, the translator and the stator further include levitator electrodes on the same surface as the drive electrodes. The translator includes a first set of levitator electrodes that are located on the lower surface of the translator. The stator includes a second set of levitator electrodes that are located on the upper surface of the stator. Unlike the drive electrodes, the levitator electrodes are positioned with the length of the levitator electrodes parallel to the travel direction of the translator. Preferably, the levitator electrodes on the translator and the levitator electrodes on the stator have the same pitch, such that each levitator electrode on the translator can be vertically aligned with a levitator electrode on the stator. These levitator electrodes are electrically connected to two or more voltage sources that provide fixed voltage patterns of alternating high and low voltages to the levitator electrodes. The fixed patterns are applied to the levitator electrodes such that the levitator electrodes of the translator having the high voltage are vertically aligned with the levitator electrode of the stator having the high voltage, thereby generating a repulsive electrostatic force between the two levitator electrodes. However, the high voltage applied to the levitator electrodes of the translator does not have to be the same high voltage applied to the levitator electrodes of the stator. For example, the voltage pattern on the levitator electrodes of the stator may be an alternating sequence of five volts and zero volts and the voltage pattern on the levitator electrodes of the translator may be an alternating sequence of six volts and zero volts. In this example, the levitator electrodes of the stator having six volts would be vertically aligned with the levitator electrodes of the translator having five volts. Since the levitator electrodes are parallel to the travel direction of the translator, the levitator electrodes are not misaligned when the translator has been laterally displaced. The repulsive electrostatic forces generated between the translator and the stator by the levitator electrodes operate to negate any attractive forces generated by the drive electrodes when the translator is laterally displaced.

In a first embodiment of the switching device, the translator includes an opening located near the center of the translator. The opening is of sufficient size to allow the micromirror to be positioned within the opening. As the translator is laterally displaced, the micromirror pivots out of the opening of the translator to the reflective orientation. In a second embodiment of the switching device, the micromirror is located in front of the translator. In both embodiments, the micromirror is attached to the translator by two actuation arms that pivot the micromirror when the translator is laterally displaced.

Although the switching device of the invention is well-suited for optical switching operation, the switching device may be utilized in other applications. The micromirror of the switching device can be incrementally pivoted by short lateral displacements of the translator. Consequently, an optical beam may be reflected to a number of different destinations by the switching device. Therefore, the switching device may be included in other systems to function as a beam steering device. For example, the switching device may be utilized to lock a signal beam to a receiver, to scatter a laser beam for UPC scanning, or to steer optical signals for demultiplexing.

An advantage of the invention is that the design of the electrostatic actuator and the micromirror allows the switching device to be manufactured as a micromachine. In addition, the electrostatic actuator has a low operating voltage such that the electrostatic actuator is compatible with complementary metal-oxide semiconductor (CMOS) circuitry.

BRIEF DESCRIPTION OF THE DRAWINGS

FIG. 7 is a bottom view of a translator of the switching device of FIG. 2, illustrating the configuration of translator electrodes on the lower surface of the translator.

DETAILED DESCRIPTION

Figure 1:
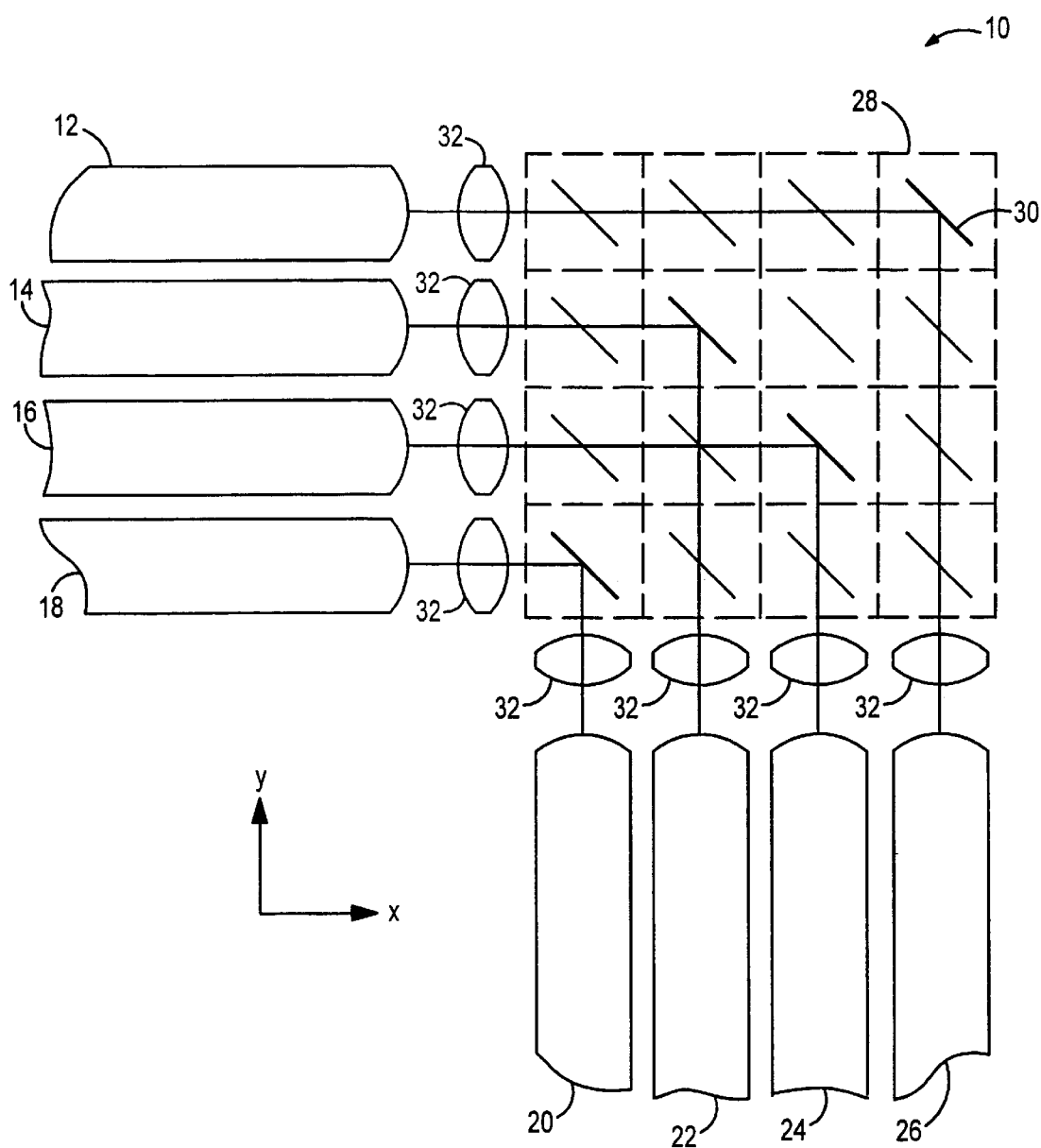
FIG. 1 is a schematic diagram of an optical switch having a number of switching devices in accordance with the present invention.

With reference to FIG. 1, an exemplary optical switch 10 in accordance with the present invention is shown. The optical switch 10 operates to selectively couple the optical fibers 12, 14, 16 and 18 to optical fibers 20, 22, 24 and 26, such that each one of the optical fibers 12–18 is in communication with one of the optical fibers 20–26. The optical fibers 12–26 may be uni-directional or bi-directional optical fibers. The type of optical fibers 12–26 is not critical to the invention.

The optical switch 10 includes a number of switching devices 28 that can redirect optical signals when activated. The exact number of the switching devices in the optical switch can vary, depending on the number of optical fibers being coupled by the optical switch and the number of possible coupling configurations of the optical switch. As shown in FIG. 1, the optical switch contains sixteen switching devices in a 4×4 arrangement. Each switching device includes a micromirror 30 that can be perpendicularly positioned (the "reflective orientation") with respect to the XY plane to reflect an optical signal from one of the optical fibers 12–18 to one of the optical fibers 20–26. The reflective orientation of the micromirror is induced when the embodying switching device is activated. When deactivated, the micromirror is positioned generally parallel (the "non-reflective orientation") to the XY plane such that an optical signal is transmitted through the embodying switching device without being deflected by the device. By selectively activating four switching devices, each optical fiber 12–18 can be coupled to a particular optical fiber 20–26.

In FIG. 1, the four activated switching devices 28 are identified by thicker lines, representing that the micromirrors 30 are in the reflective orientation. Each activated switching device optically couples an optical fiber 12–18 that is aligned laterally with that device to an optical fiber 20–26 that is aligned vertically with that device. The activated switching devices have been selected to optically couple the optical fibers 12, 14, 16 and 18 to the optical fibers 26, 22, 24 and 20, respectively.

The optical switch 10 also includes lenses 32 positioned between each optical fiber 12–26 and the optical switch. The lenses operate to focus the optical signals that have emanated from the optical fibers 12–26 and to refocus the optical signals prior to entering the optical fibers 12–26. The lenses are not critical to the operation of the optical switch.

Figure 2:
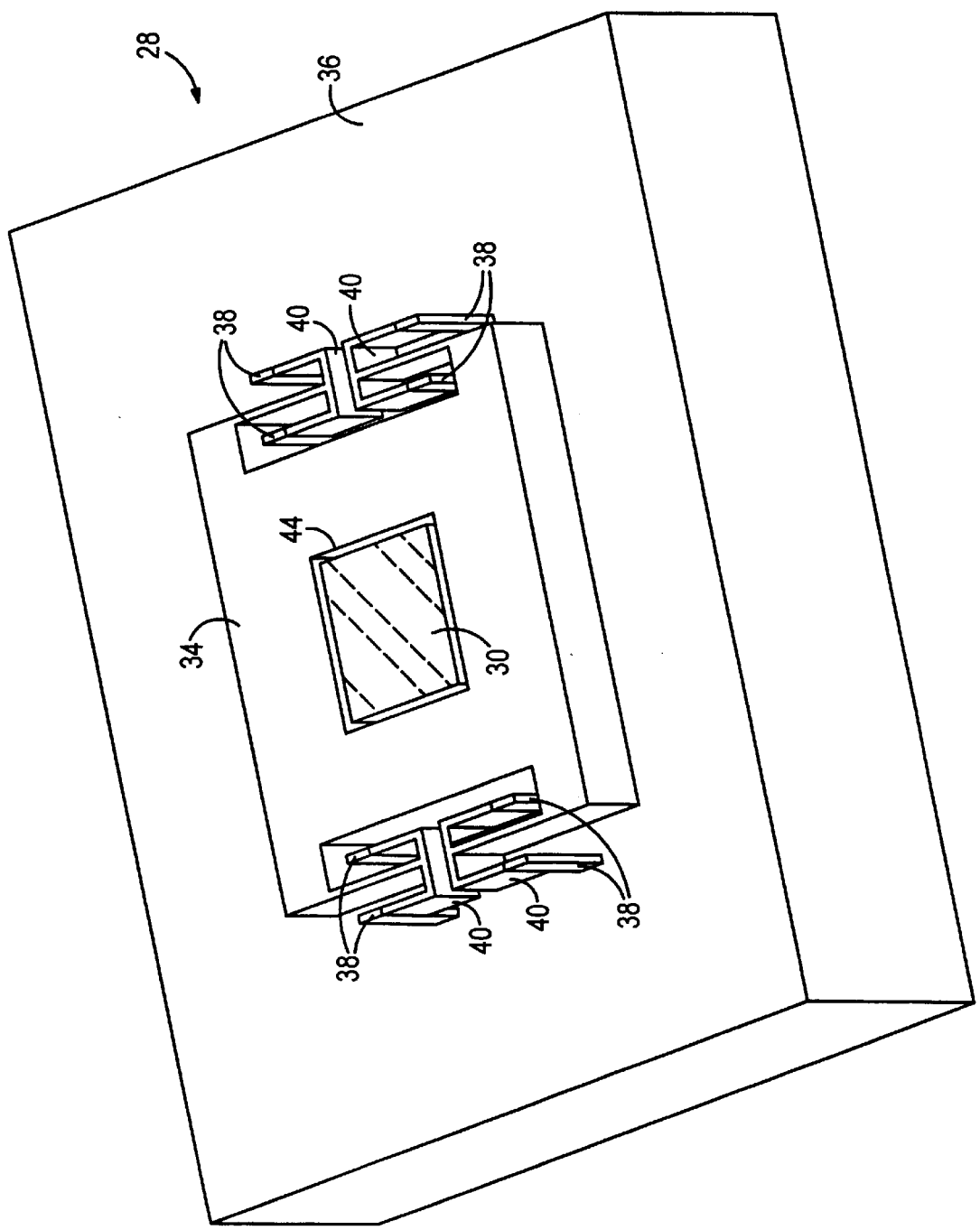
FIG. 2 is a perspective view of a switching device in accordance with a first embodiment of the present invention.

Turning to FIG. 2, a switching device 28 of the optical device 10 in accordance with a first embodiment is shown. The switching device includes a translator 34 and a micromirror 30 that are attached to a stator 36. The translator and the stator may be made of silicon. The micromirror may also be made of silicon with a layer of Au for the reflective surface. The translator is attached to the stator by eight translator supports 38. The translator supports are affixed to the upper surface of the stator and to one of four E-shaped flexures 40 of the translator. The flexures allow the translator to move in the X-direction, while the stator remains stationary. As an example, the flexures may have a thickness of 2 $\mu$m and a depth of 100 $\mu$m.

Figure 3:
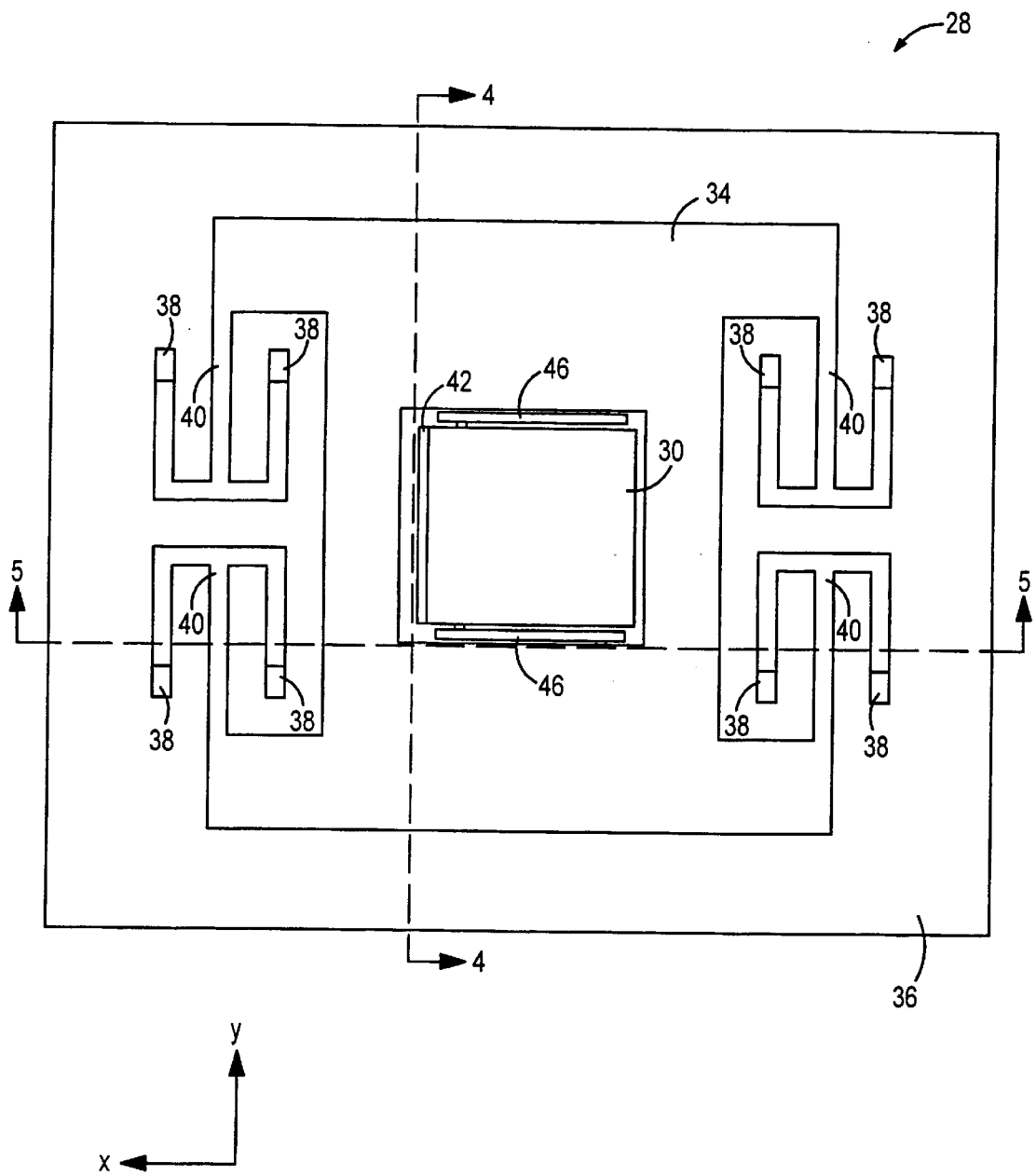
FIG. 3 is a top view of the switching device of FIG. 2.

The micromirror 30 is attached to the stator 36 by a pivoting strip 42 (not shown in FIG. 2) that allows the micromirror to rotate about the side of the micromirror that is affixed to the strip. The pivoting strip may be a thin film of silicon nitride (SiN). The material utilized to form the pivoting strip is not critical to the invention. The translator 34 includes an opening 44 that provides enough space for the micromirror to pivot from the non-reflective orientation, i.e., the orientation shown in FIG. 2, to the reflective orientation, i.e., a vertical orientation such that the micromirror is parallel to the YZ plane. The micromirror is also attached to the translator, as shown in FIG. 3. The physical attachment of the micromirror to the translator allows the micromirror to be pivoted by a lateral displacement of the translator.

The translator 34 and the stator 36 form an electrostatic surface actuator that operates to pivot the micromirror 30 to either the reflective or non-reflective orientation. The translator 34 and the stator 36 both include electrodes (shown in FIGS. 6 and 7) located on the opposing surfaces of the translator and the stator. When the electrostatic actuator is activated, the electrostatic forces created by applying voltages to the electrodes of the translator and the stator can be manipulated to laterally displace the translator with respect to the stator in the X-direction. The displacement operation of the translator and the stator will be described below. The lateral movement of the translator pivots the micromirror from the non-reflective orientation to the reflective orientation. When deactivated, the translator is designed to move in the negative X-direction back to the original position. This reverse displacement of the translator pivots the micromirror from the reflective orientation to the non-reflective orientation. The pivoting of the micromirror will be further described below.

Figure 4:
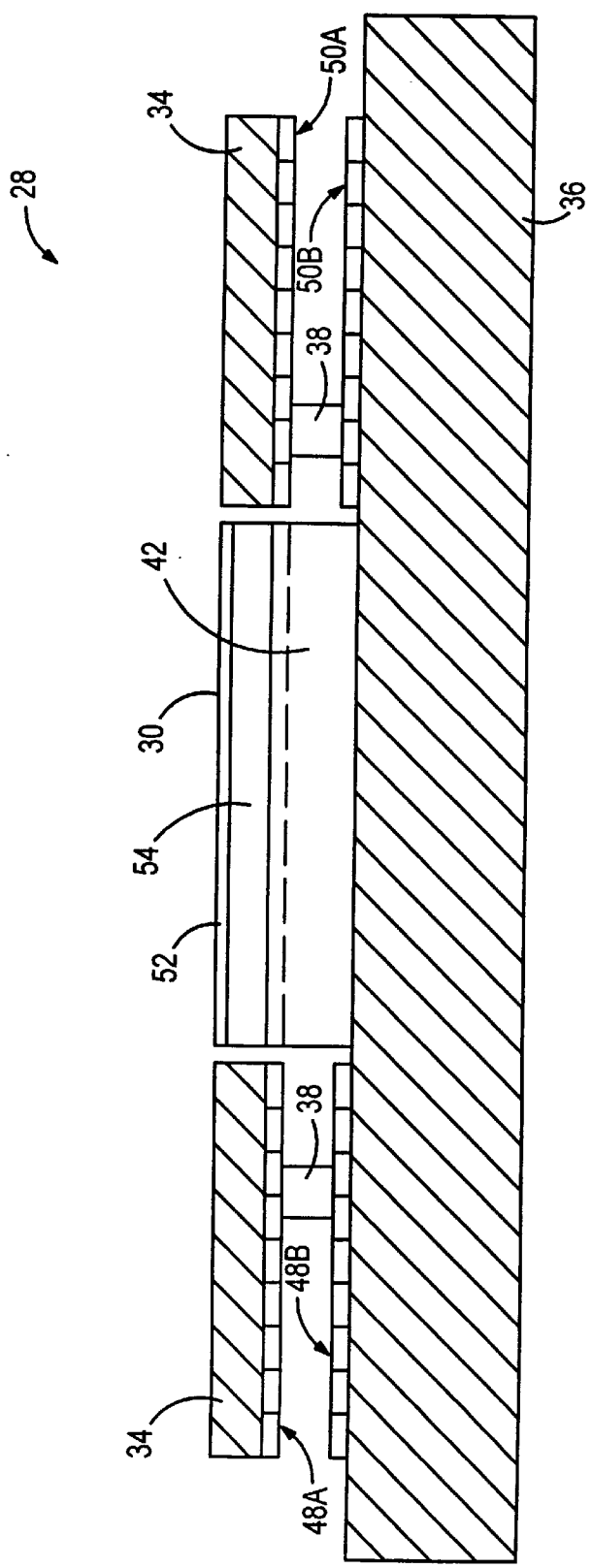
FIG. 4 is a first cross-sectional view of the switching device of FIG. 2.
Figure 5:
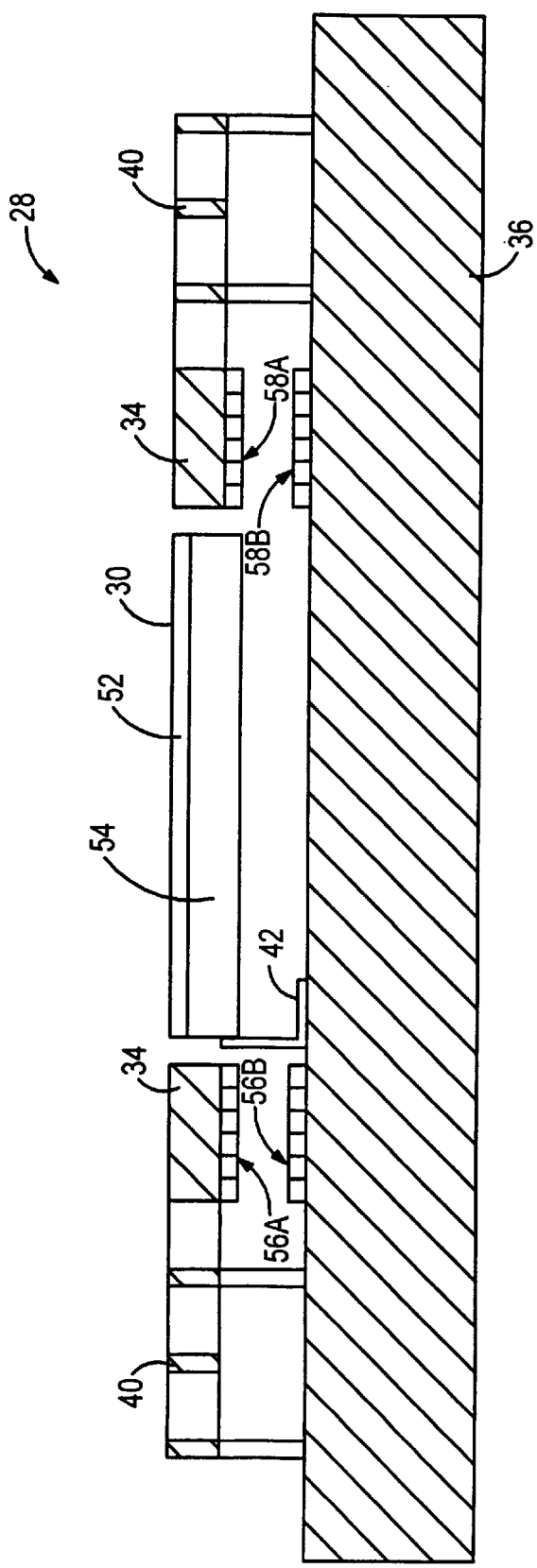
FIG. 5 is a second cross-sectional view of the switching device of FIG. 2.

In FIGS. 3–7, various views of the switching device 28 are shown. FIG. 3 is a top view of the switching device. Shown in FIG. 3 are actuation arms 46 that pivot the micromirror 30 when the translator 34 is laterally displaced. FIGS. 4 and 5 are cross-sectional views of the switching device. The locations of the cross-sections depicted in FIGS. 4 and 5 are shown in FIG. 3. In FIG. 4, four sets of levitator electrodes 48A, 50A, 48B and 50B are depicted. The levitator electrodes 48A and 50A are attached to the bottom surface of the translator 34, while the levitator electrodes 48B and 50B are attached to the upper surface of the stator 36. Each levitator electrode is a thin strip of conductive material that is parallel to the other levitator electrodes in the set. The exact number of the levitator electrodes included in the switching device is not critical to the invention. These electrodes generate electrostatic forces that do not contribute to laterally displace the translator 34. Instead, the electrodes operate to provide "levitation" forces that are normal to the opposing surfaces of the translator 34 and the stator 36. The levitator electrodes 48A and 48B generate a first set of repulsive forces and the levitator electrodes 50A and 50B generate a second set of repulsive forces. These repulsive forces oppose a close proximity approach of the translator to the stator. Also shown in FIG. 4 are a reflective layer 52 and a mirror substrate 54 of the micromirror 30. A portion of the mirror substrate is visually obstructed by the pivoting strip 42 that affixes the micromirror to the stator. The obstructed lower surface of the mirror substrate is illustrated in FIG. 4 by the dotted line.

In FIG. 5, a second cross-sectional view of the switching device 28 is shown. For simplification, the actuation arm 46 is not shown in FIG. 5. In this view, one side of the micromirror 30 is clearly illustrated, depicting the reflective layer 52 and the mirror substrate 54 of the micromirror. Furthermore, the pivoting strip 42 that connects the micromirror to the stator 36 is shown in an exemplary arrangement. The exemplary pivoting strip 42 has an "L" configuration in which a horizontal portion of the pivoting strip is attached to the stator and an upper portion of the pivoting strip is attached to the micromirror. Other configurations for the pivoting strip include having the horizontal portion of the pivoting strip in front of the micromirror, instead of beneath the micromirror and/or having the upper attached portion of the pivoting strip on the lower surface of the micromirror. The micromirror is positioned in the non-reflective orientation, as shown in FIG. 5. In this orientation, the micromirror is co-planar with the upper surface of the translator 34 and consequently, parallel to the upper surface of the stator.

Also shown in FIG. 5 are two sets of drive electrodes 56A and 58A and two sets of stator electrodes 56B and 58B. The drive electrodes 56A and 58A are located on the bottom surface of the translator 34, while the drive electrodes 56B and 58B are located on the upper surface of the stator 36. These drive electrodes generate the electrostatic forces that will laterally displace the translator 34, thereby pivoting the micromirror 30. The generation of the electrostatic forces by the drive electrodes will be described below. Each drive electrode is a thin strip of conductive material that is parallel to the other drive electrodes in the set.

In the preferred embodiment, a thin layer of insulating material (not shown) is located between the translator electrodes 48A, 50A, 56A and 58A and the translator 34. Similarly, another layer of insulating material (not shown) is located between the stator electrodes 48B, 50B, 56B and 58B and the stator 36. These layers electrically isolate each electrode, so that electrical charge on a particular electrode is not lost to another electrode via the stator or the translator.

Figure 6:
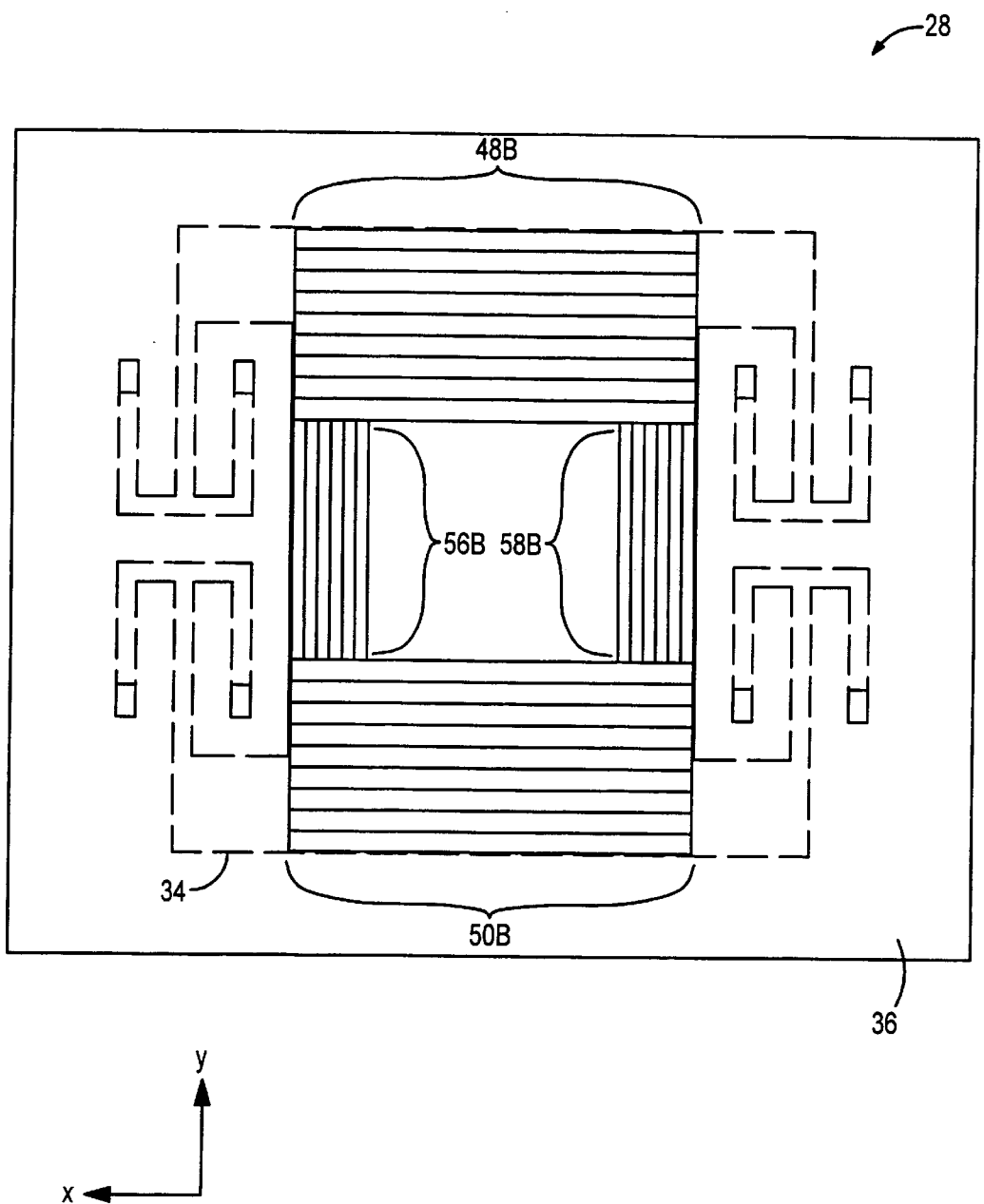
FIG. 6 is a top view of a stator of the switching device of FIG. 2, illustrating the configuration of stator electrodes on the upper surface of the stator.

Turning to FIG. 6, the upper surface of the stator 36 is shown. A dotted outline of the translator 34 is depicted on the surface of the stator 36 to illustrate the position of the translator 34 with respect to the electrodes 48B, 50B, 56B and 58B of the stator. In FIG. 7, the lower surface of the translator 34 is shown. The translator electrodes 48A, 50A, 56A and 58A are positioned in a mirror image of the stator electrodes 48B, 50B, 56B and 58B. Therefore, the translator electrodes 48A, 50A, 56A and 58A will be situated directly above the stator electrodes 48B, 50B, 56B and 58B, respectively, in the switching device 28.

The electrostatic forces that laterally displace the translator 34 are generated by the translator drive electrodes 56A and 58A and the stator drive electrodes drive 56B and 58B. The electrostatic forces between the opposing drive electrodes 56A and 56B are generated by applying different voltages to these electrodes. The electrostatic forces between the opposing electrodes 58A and 58B are generated in an identical manner. By varying the electrostatic forces between these drive electrodes, the translator 34 can be displaced in a predetermined direction. In order to ensure that the generated electrostatic forces will be optimal for laterally displacing the translator 34, it is desirable to keep the ratio of the repeat distance associated with the translator drive electrodes 56A and 58A and the gap distance between the stator drive electrodes 56B and 58B and the translator drive electrodes 56A and 58B within a certain range. The repeat distance is the distance between the center of a translator drive electrode 56A or 58A held at a particular voltage and the center of the nearest translator drive electrode 56A or 58A, respectively, held at approximately the same voltage. In the preferred embodiment, where every other translator drive electrode 56A or 58A is held at the same voltage, the repeat distance is twice the center-to-center spacing of the translator drive electrodes 56A and 58A, assuming that the spacing is constant. To minimize the forces in the Y-direction, it is desirable to keep the repeat distance divided by the distance between the stator drive electrodes 56B and 58B and the translator drive electrodes 56A and 58A below approximately sixteen.

Figure 8:
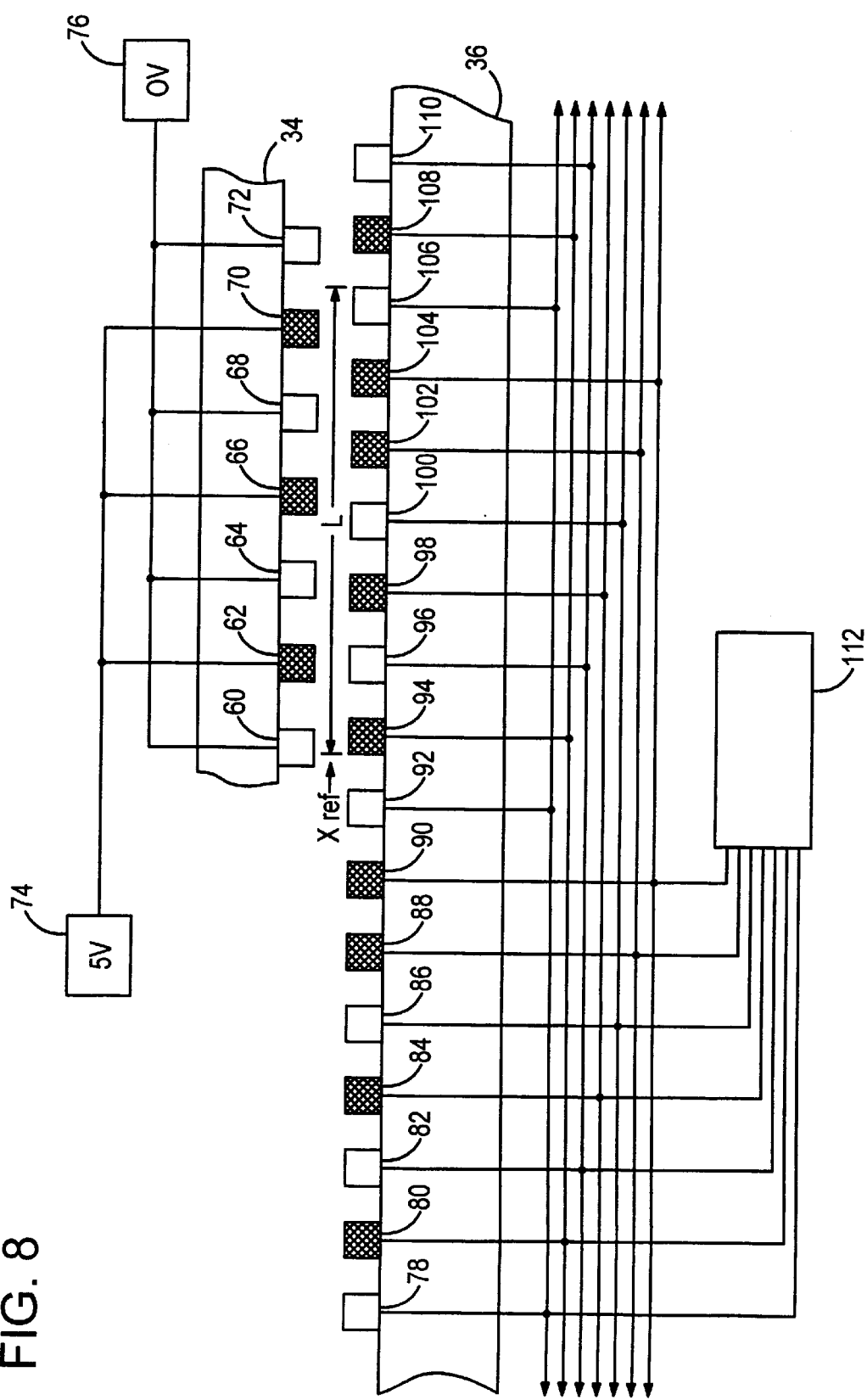
FIGS. 8–10 are cross-sectional views of the switching device of FIG. 2, illustrating changes in the voltage pattern of the stator electrodes that are responsible for laterally displacing the translator.

There are numerous ways to apply the voltages to the drive electrodes to generate and vary the electrostatic forces. An exemplary manner to generate and vary the electrostatic forces between the drive electrodes 56A, 56B, 58A and 58B to displace the translator 34 will now be described with reference to FIGS. 8, 9 and 10. In FIG. 8, cross-sectional segments of the translator 34 and the stator 36 are shown. The translator is illustrated with a number of translator electrodes 60, 62, 64, 66, 68, 70 and 72 that are electrically coupled to either a voltage source 74 or 76 in an alternating fashion. These translator electrodes represent the electrodes 56A or 58A. The voltage source 74 provides a constant voltage of positive five volts to the electrodes 62, 66 and 70, while the voltage source 76 provides a constant voltage of zero volts to electrodes 60, 64, 68 and 72. The stator 36 is illustrated with a number of stator electrodes 78, 80, 82, 84, 86, 88, 90, 92, 94, 96, 98, 100, 102, 104, 106, 108 and 110 that are coupled to a controller 112. The controller 112 selectively provides either zero volts or positive five volts to the stator electrodes 78–110. The translator electrodes 60–72 are spaced such that approximately six translator electrodes are situated for a specific length L, while approximately seven stator electrodes are situated for the same length L. Since the stator will remain stationary as the translator is laterally displaced, the left edge of the stator electrode 94 will be designated as a reference point $X_{ref}$.

Figure 9:
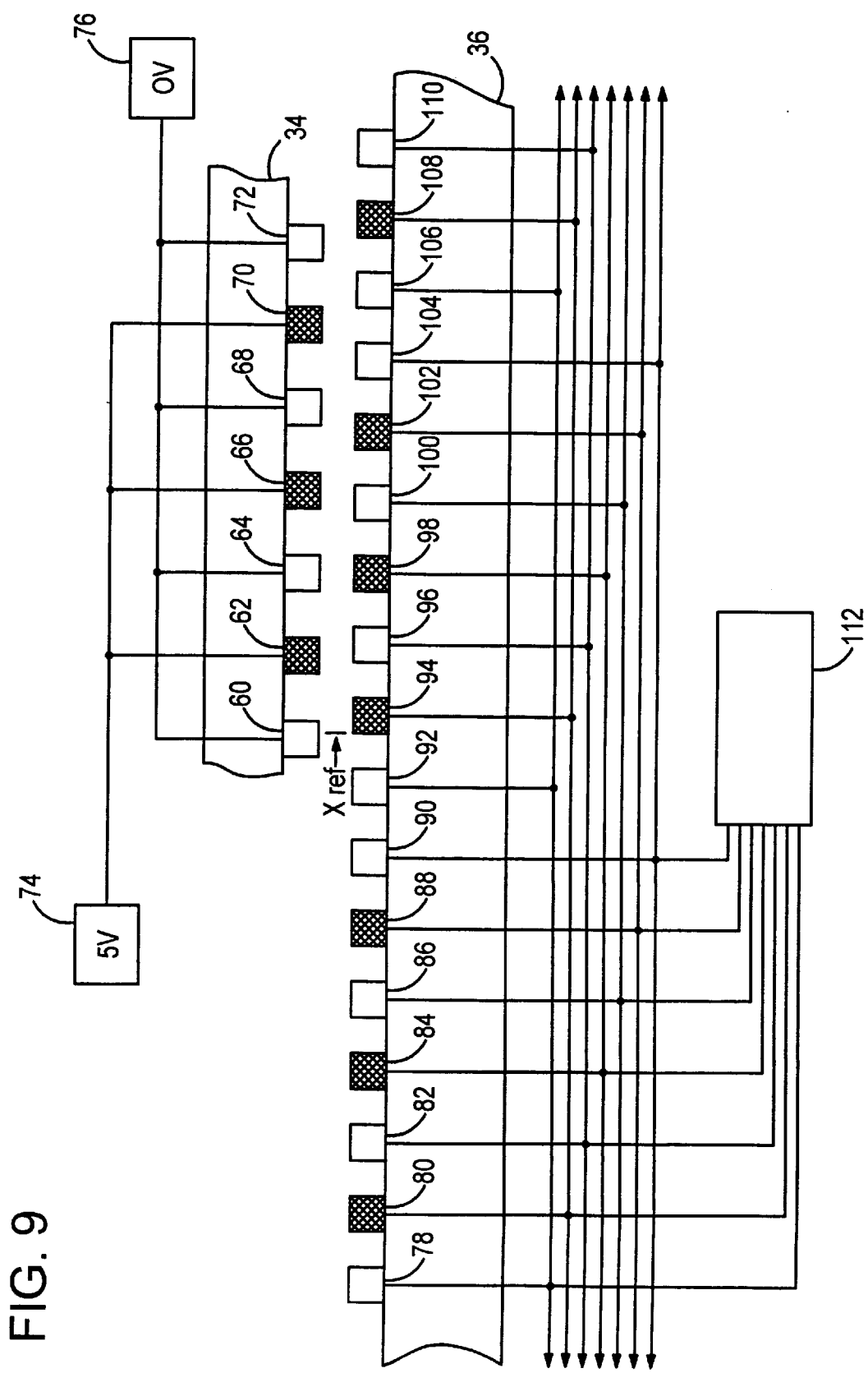
Figure 10:
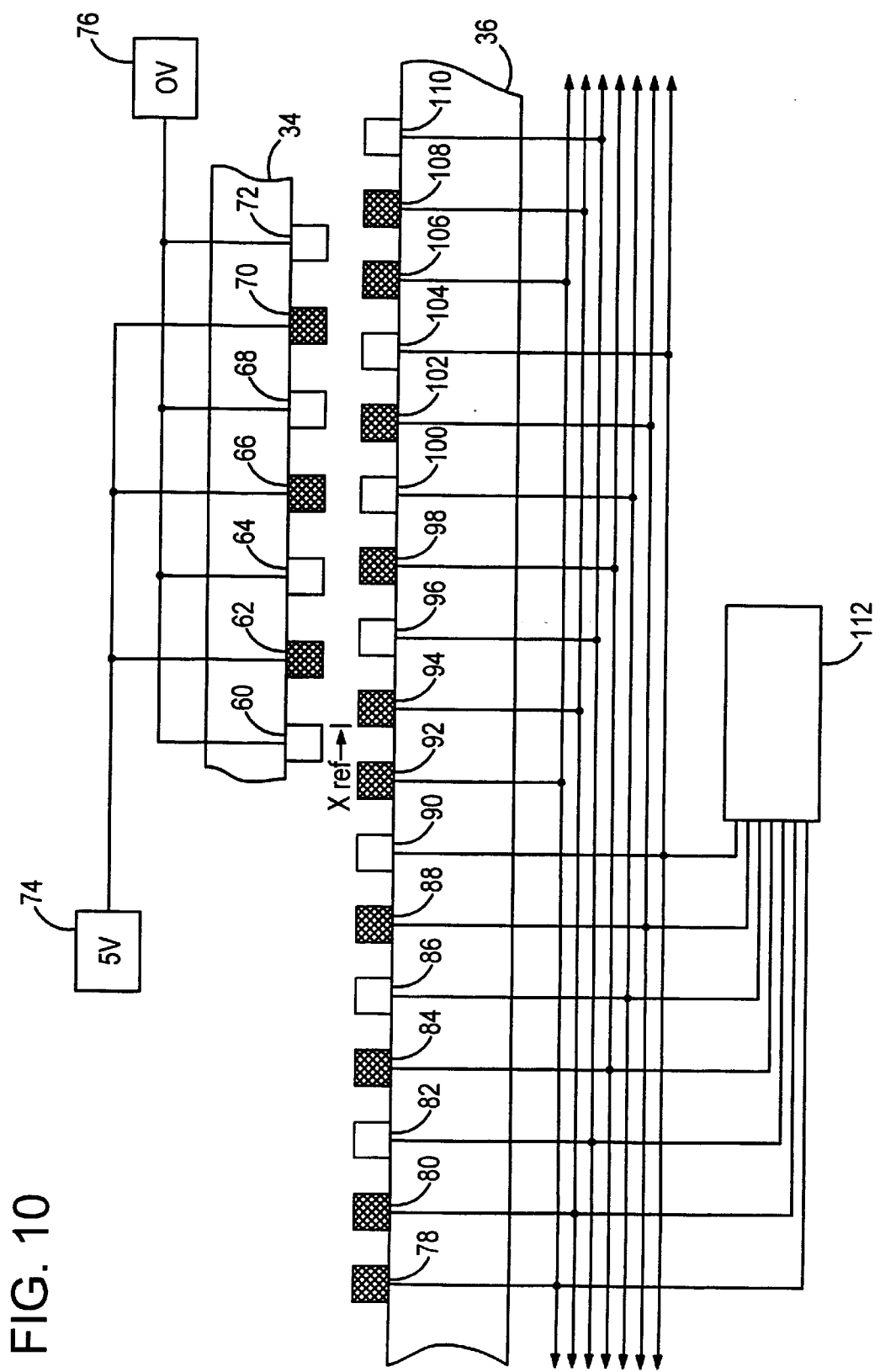

Initially, the controller 112 applies five volts to stator electrodes 76, 80, 84, 86, 90, 94, 98, 100 and 104, as shown in FIG. 8. The electrodes that are supplied with five volts have been cross-hatched to ease identification. In order to displace the translator 34 to the X-direction, i.e. to the left, every seventh stator electrode is switched from the original voltage of zero or five volts to the other voltage of zero or five volts by the controller 112. In this exemplary manner, the stator electrodes 90 and 104 have been switched from five volts to zero volts, as shown in FIG. 9. This change causes a net electrostatic force on the translator 34, which incrementally displaces the translator 34 in the X-direction. Next, every seventh stator electrode 78, 92 and 106 that is just right of the stator electrodes 90 and 104 that were previously switched are switched to further displace the translator in the X-direction. The stator electrodes 78, 92 and 106 are switched from zero volts to five volts by the controller 112. The resulting voltage pattern is shown in FIG. 10. Similar to the previous change, this change in the voltage pattern of the stator electrodes 78–110 incrementally displaces the translator in the X-direction. By continually switching the voltages for every seventh stator electrode in this fashion, the translator is further moved in the X-direction. However, there is a limit to the total displacement of the translator from its original position, due to the fact that the translator is physically coupled to the stator 36 by the flexures 40 and the translator supports 38.

Other configurations of drive electrodes and applied voltages are possible for applying lateral forces to the movable translator 34. The method of applying voltages described above is directly extendable to groups of electrodes in which the first set of electrodes is comprised of groups of 2*n electrodes and the second set of electrodes is comprised of groups of 2*n±1 electrodes. Similar to the above method, an alternating pattern of voltages is applied to the first set of electrodes and a basically alternating pattern of voltages is applied to the second set of electrodes. Because the second set of electrodes consists of groups of an odd number of electrodes, two electrodes in each group have the same voltage as one of their nearest neighbors. Similar to the above method, movement of the translator is induced by switching the voltage on the electrodes that have the same voltage as their nearest neighbor.

Other electrostatic surface drives are also applicable to this invention. One example is described by Higuchi et al. in U.S. Pat. No. 5,448,124. In this case, the pitches of the first and second set of drive electrodes are similar and three-phase temporally alternating voltages are applied to both the first and second sets of drive electrodes. The position of the translator is controlled by varying the phase difference between the three phase signals applied to the first and second sets of electrodes.

The repulsive forces that act as levitation forces to maintain the translator 34 at a distance from the stator 36 are generated by the translator levitator electrodes 48A and 50A and the stator levitator electrodes 48B and 50B. Preferably, the levitator electrodes 48A and 50A of the translator and the levitator electrodes 48B and 50B of the stator have the same pitch, such that each translator electrode 48A and 50A is positioned directly above one of the stator electrodes 48B and 50B. When the like voltages are applied to the translator electrode and the opposing stator electrode, a repulsive force is created between them. Since the lengths of the electrodes 48A, 48B, 50A and 50B are parallel to the X axis, the alignment between the translator electrodes 48A and 50A and the stator electrodes 48B and 50B will not be altered by the lateral displacement of the translator in the X-direction. Thus, the repulsive forces between the translator and the stator will generally be constant throughout the lateral displacement of the translator. As an example, the levitator electrodes 48A, 48B, 50A and 50B may have an alternating voltage pattern of zero volts and five volts to generate the repulsive forces. However, other low and high voltages may be applied to the levitator electrodes. In fact, the low and high voltages applied to the levitator electrodes of the translator need not be the same voltages applied to the levitator electrodes of the stator.

Figure 11:
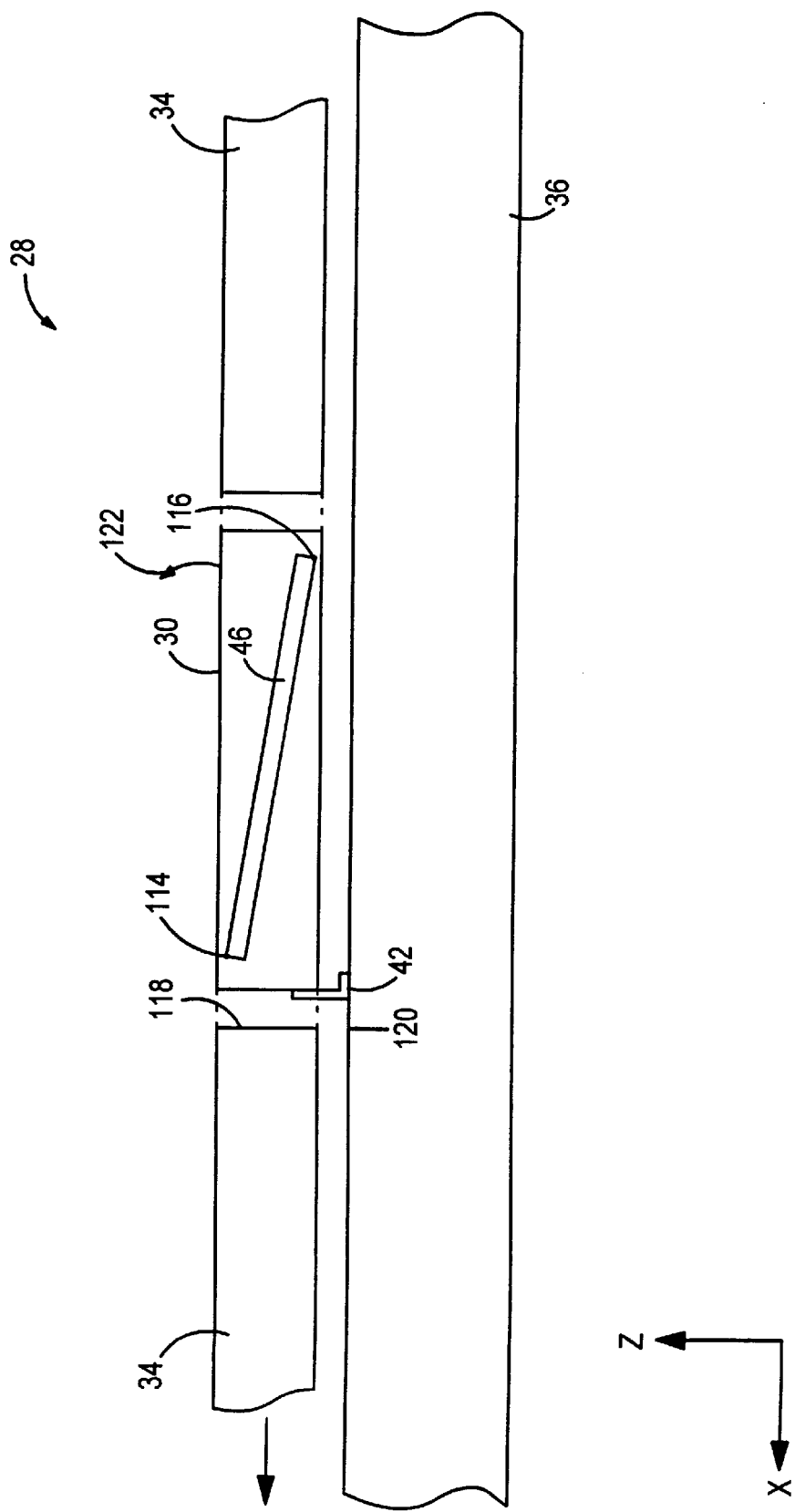
FIGS. 11–13 are cross-sectional views of the switching device of FIG. 2, illustrating the pivoting of a micromirror of the switching device as the translator is laterally displaced.
Figure 12:
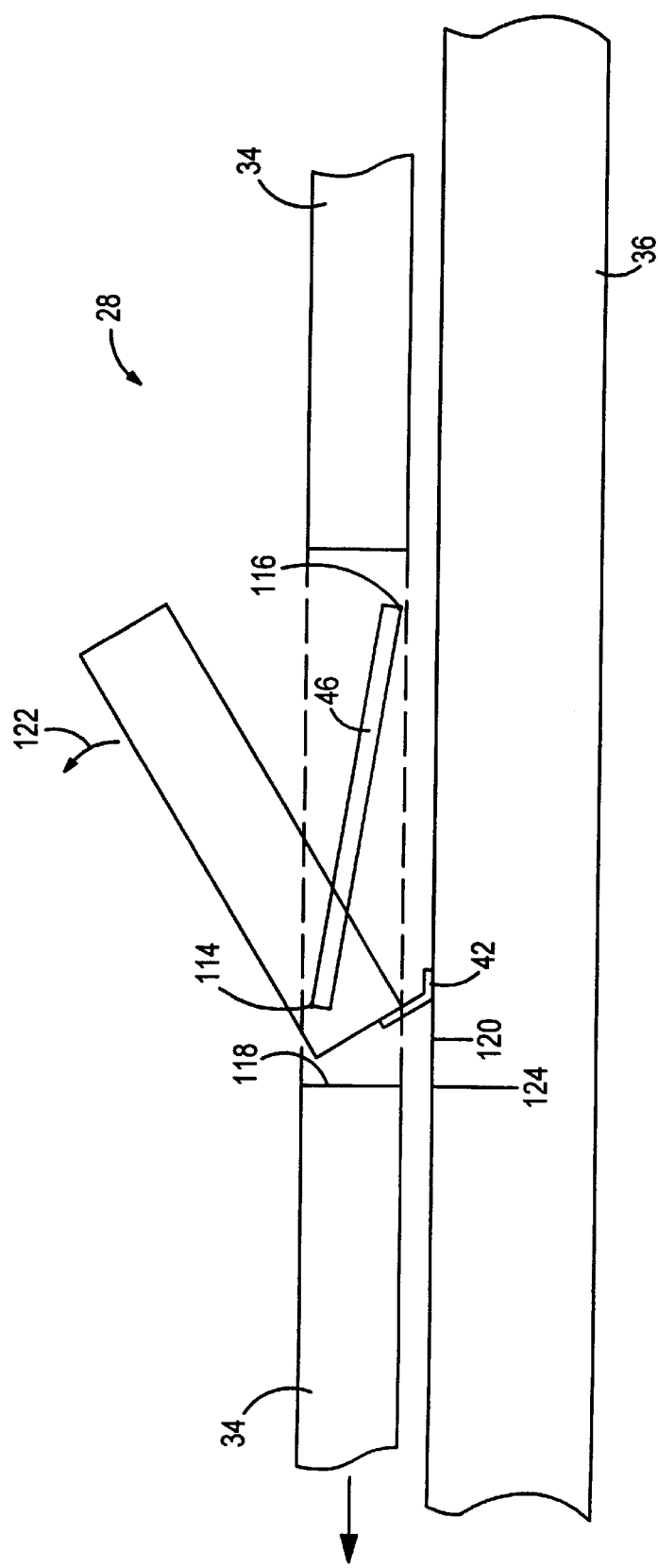
Figure 13:
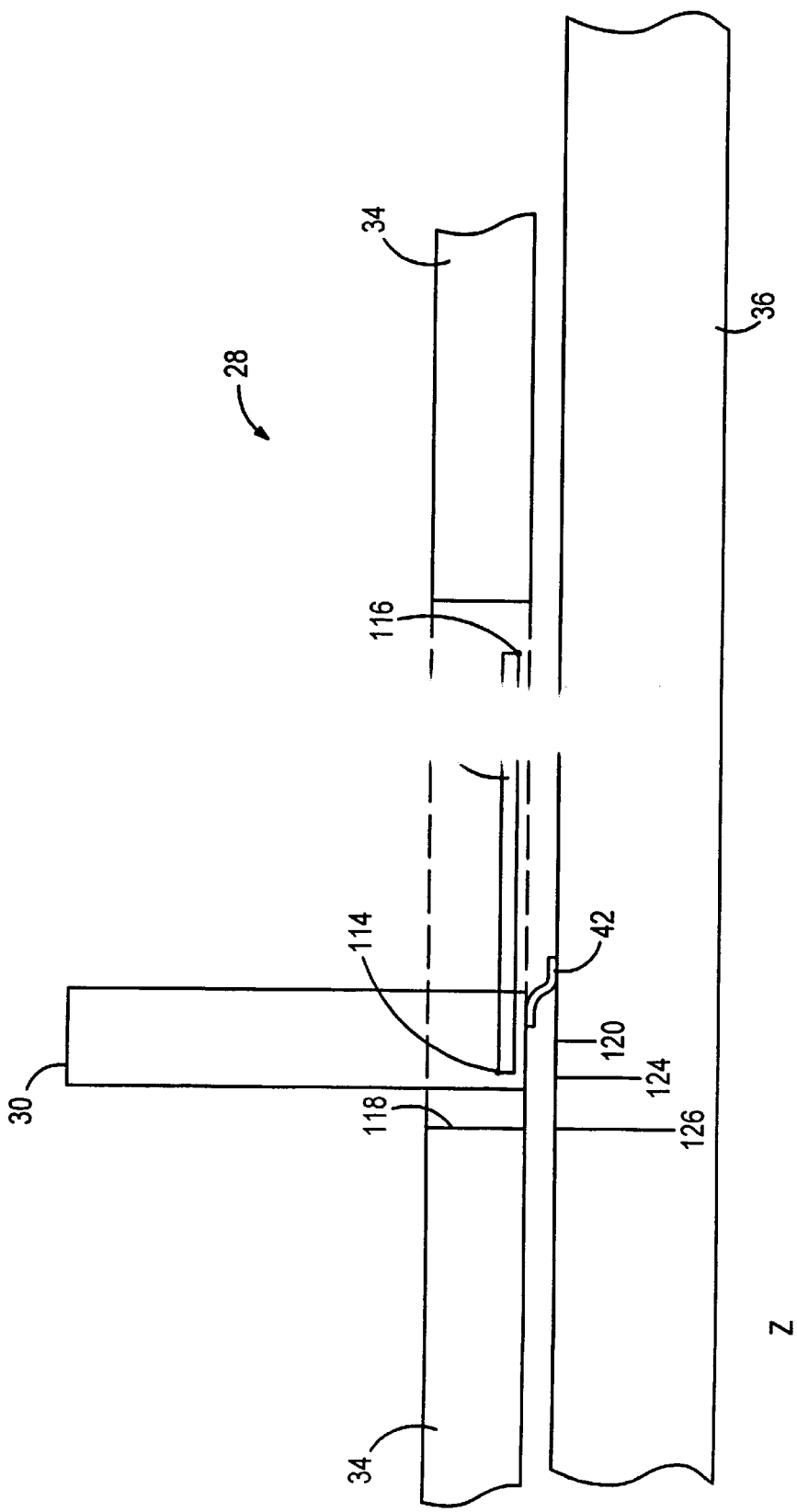

As stated above, the lateral displacement of the translator 34 induces the micromirror 30 to be positioned from the non-reflective orientation to the reflective position. The positioning process of the micromirror will now be described with reference to FIGS. 11, 12 and 13. FIGS. 11–13 are various cross-sectional views of the switching device 28, illustrating the pivoting of the micromirror as the translator is laterally displaced. The view point of FIGS. 11–13 is identical to the view point of FIG. 5. The dashed lines represent a portion of the translator that is not visible to the current view point. The actuation arm 46 is attached to the micromirror at a location 114 and is also attached to the translator 34 at location 116. The actuation arm is preferably attached to the micromirror and the translator 34 by a flexible film, so that the actuation arm can rotate about the locations 114 and 116. For clarification, electrodes 56A, 56B, 58A and 58B are not shown in FIGS. 11–13. Furthermore, the reflective layer 52 and the mirror substrate 54 of the micromirror 30 are not shown.

In FIG. 11, the translator 34 is situated in the original position. The original position is the resting position of the translator, when there are no electrostatic forces generated between the translator and the stator 36. At the original position, an inner surface 118 of the translator is positioned directly over a reference line 120 on the stator. When electrostatic forces are initially generated by applying voltages to the electrodes 56A, 56B, 58A and 58B in a first voltage pattern, as illustrated in FIG. 8, the translator may shift slightly in either direction along the x-axis, until an equilibrium is reached. As the voltage pattern is reconfigured, as illustrated in FIGS. 9 and 10, the net electrostatic force along the X-axis displaces the translator to the left. Since the actuation arm 46 is attached to the translator at the location 116, the actuation arm will be pushed in the X-direction. The movement of the actuation arm creates a torque to pivot the micromirror in a direction of arrow 122, which is caused by the fact that the micromirror is attached to the actuation arm at the location 114 and is also attached to the stator 36 by the pivoting strip 42.

In FIG. 12, the translator 34 has been displaced such that the inner surface 118 of the translator 34 is now positioned over a reference line 124 on the stator 36. The displacement of the translator over the distance between the reference lines 120 and 124 has pivoted the micromirror 30 by a significant amount, as shown in FIG. 12. In FIG. 13, the micromirror has been pivoted to an upright position, i.e., the reflective orientation. In addition, the translator has been further displaced such that the inner surface 118 of the translator is now positioned over a reference line 126 on the stator. The micromirror is now in a state to reflect optical signals that are propagating along the X-axis.

The micromirror 30 can be incrementally repositioned to the non-reflective orientation, shown in FIG. 11 by displacing the translator 34 in the negative X-direction, such that the inner surface 118 of the translator 34 is positioned over the reference line 120 on the stator 36. The translator can be displaced in the negative X-direction by applying voltages to the stator drive electrodes 56B and 58B in the reverse sequence of the voltage patterns that were shown in FIGS. 8–10. In an alternative operation, the voltages that are applied to the drive electrodes 56A, 56B, 58A and 58B may be terminated to eliminate the electrostatic forces that are responsible for the lateral movement of the translator. When these electrostatic forces are removed, the flexures 40 of the translator will return to the normal state, thereby laterally displacing the translator to the original position.

Figure 14:
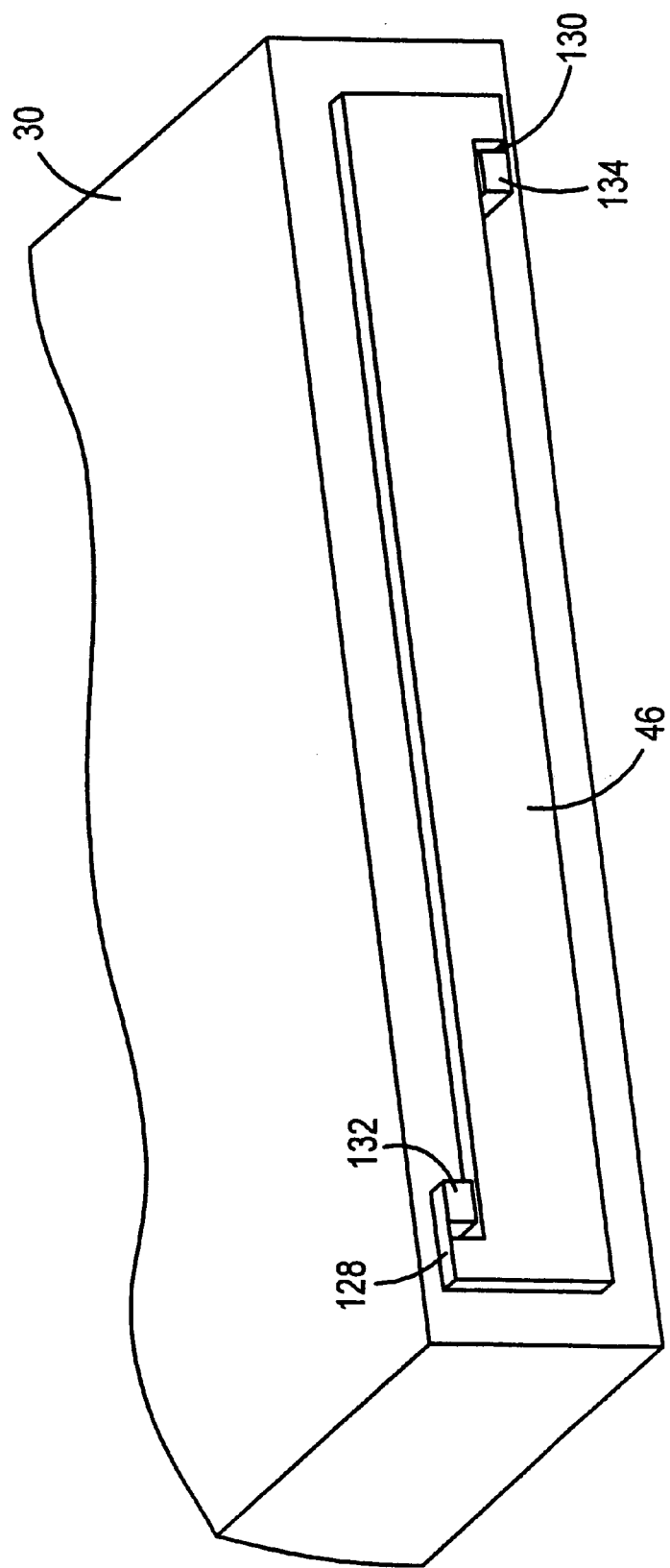
FIG. 14 is a perspective view of an actuation arm of the switching device of FIG. 2 in accordance with an exemplary embodiment.

Turning to FIG. 14, a detailed view of the actuation arm 46 in accordance with an exemplary embodiment is shown. The actuation arm 46 is attached to the micromirror 30 and the translator 34 (not shown in FIG. 14) by thin flexible films 128 and 130. The flexible films may be made of SiN. The material of the flexible films is not critical to the invention. The film 128 is attached to the actuation arm 46 and a protruding member 132 that is coupled to the micromirror. The film 130 is attached to the actuation arm and a protruding member 134 that is coupled to the translator. The films 128 and 130 allow the micromirror to pivot while the actuation arm rotates about the members 132 and 134.

Figure 15:
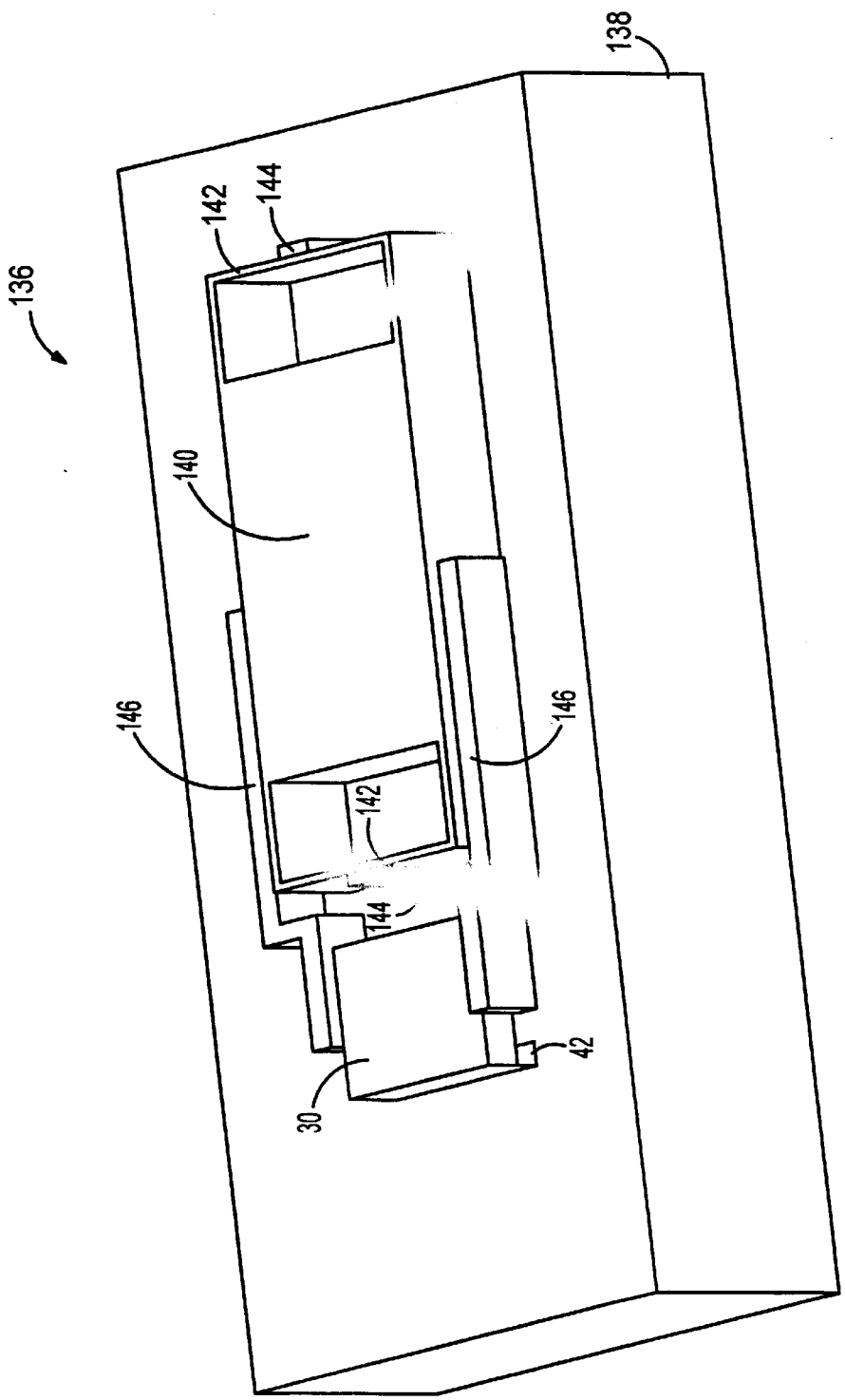
FIG. 15 is a perspective view of a switching device in accordance with a second embodiment of the present invention.

In FIG. 15, a switching device 136 of the optical device 10 in accordance with a second embodiment is shown. The same reference numerals of FIG. 2 will be used for the same components shown in FIG. 15. The switching device 136 includes a stator 138, a translator 140, and the micromirror 30. The translator and the stator may be made of silicon. Similar to the switching device 28, the switching device 136 operates to pivot the micromirror 30 between the non-reflective orientation and the reflective orientation by laterally displacing the translator with respect to the stator along the X-axis.

The micromirror 30 is attached to the stator 138 by the pivoting strip 42, which allows the micromirror to pivot about the strip. The translator 140 includes flexures 142 that are attached to translator supports 144. The translator supports 144 are affixed to the stator. However, the flexures allow the translator to move along the X-axis by bending when the translator is laterally displaced by electrostatic forces. The micromirror and the translator are mechanically coupled by a pair of actuation arms 146. When the translator is laterally displaced, the actuation arms force the micromirror to pivot to a different orientation. The actuation arms may be attached to the micromirror and the translator in the same manner as the actuation arm 46 of the switching device 28, as shown in FIG. 14. The only significant difference would be that the same sides of the actuation arms 146 are attached to the micromirror 30 and the translator 140. This difference does not change the operation of the actuation arms 146 to pivot the micromirror 30 between the reflective orientation and the non-reflective orientation.

Figure 16:
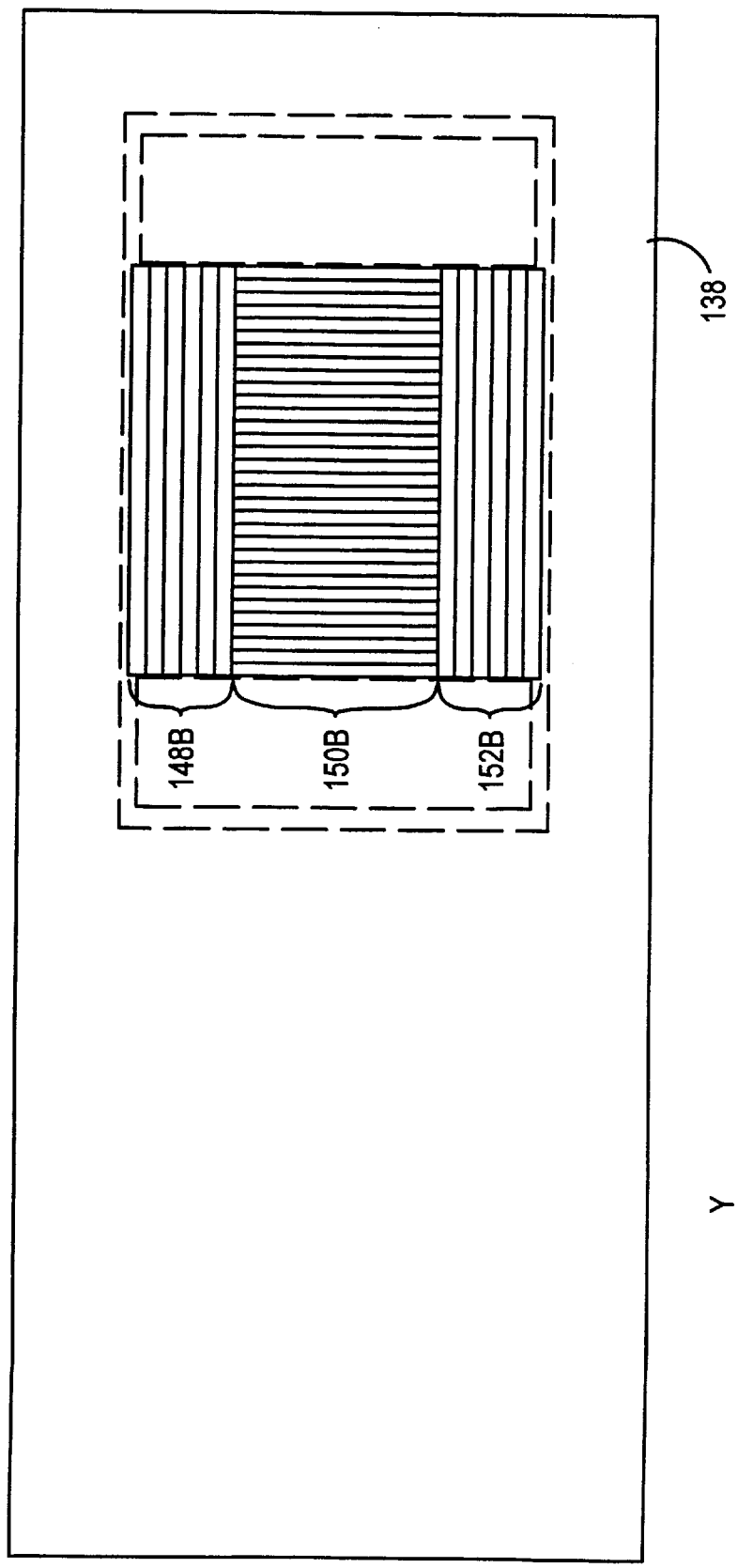
FIG. 16 is a top view of a stator of the switching device of FIG. 15, illustrating the configuration of stator electrodes on the upper surface of the stator.
Figure 17:
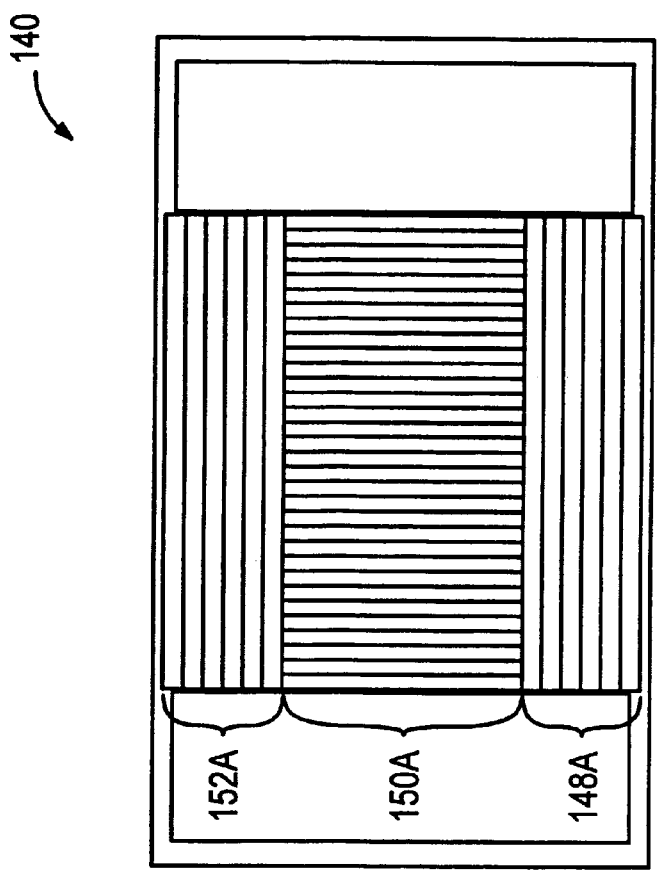
FIG. 17 is a bottom view of a translator of the switching device of FIG. 15, illustrating the configuration of translator electrodes on the lower surface of the translator.

Similar to the electrodes 48A, 48B, 50A, 50B, 56A, 56B, 58A and 58B of the switching device 28, the translator 140 and the stator 138 include sets of electrodes that generate electrostatic forces for displacement and levitation. Turning to FIG. 16, the upper surface of the stator 138 is shown. The stator includes sets of stator electrodes 148B, 150B and 152B. A dashed outline of the translator 140 is depicted on the surface of the stator 138 to illustrate the position of the translator with respect to the stator electrodes 148B, 150B and 152B. In FIG. 17, the lower surface of the translator 140 is shown. The translator includes sets of translator electrodes 148A, 150A and 152A. The translator electrodes 148A, 150A and 152A are positioned directly over the stator electrodes 148B, 150B and 152B, respectively, when the translator is in the original position over the stator. The translator electrodes 148A and 152A and the stator electrodes 148B and 152B are levitation electrodes that generate the repulsive forces to negate the attractive forces between the translator and the stator during the lateral displacement of the translator. The translator electrodes 150A and the stator electrodes 150B generate the electrostatic forces responsible for the lateral displacement of the translator.

In operation, voltages are applied to the electrodes 148A, 148B, 150A, 150B, 152A and 152B. Fixed voltages are applied to the electrodes 148A, 148B, 152A and 152B to generate the levitation forces, while the voltages that are applied to the electrodes 150A and 150B are selectively varied to generate the electrostatic forces that will laterally displace the translator 140. The fixed voltage pattern on the electrodes 148A, 148B, 152A and 152B may be identical to the fixed voltage pattern that is applied to the electrodes 48A, 48B, 50A and 50B of the switching device 28 in which voltages are applied in an alternating fashion of five volts and zero volts. The same voltage is applied to each translator electrode 148A and 152A and a stator electrode 148B and 152B that are vertically aligned, so that a repulsive force is created between them. The initial voltage pattern and the subsequent voltage patterns that are applied to the electrodes 150A and 150B to laterally displace the translator 140 may be identical to the voltage patterns that are applied to electrodes 56A, 56B, 58A and 58B of the switching device 28, as illustrated in FIGS. 8–10.

When the translator 140 is laterally displaced by the change of electrostatic forces between the electrodes 150A and 150B, the actuation arms 146 are also laterally displaced, since ends of the actuation arms are physically attached to the translator. The lateral displacement of the actuation arms pivots the micromirror 30 in the same manner as the actuation arms 46 of the switching device 28, as illustrated in FIGS. 11–13.

Figure 18:
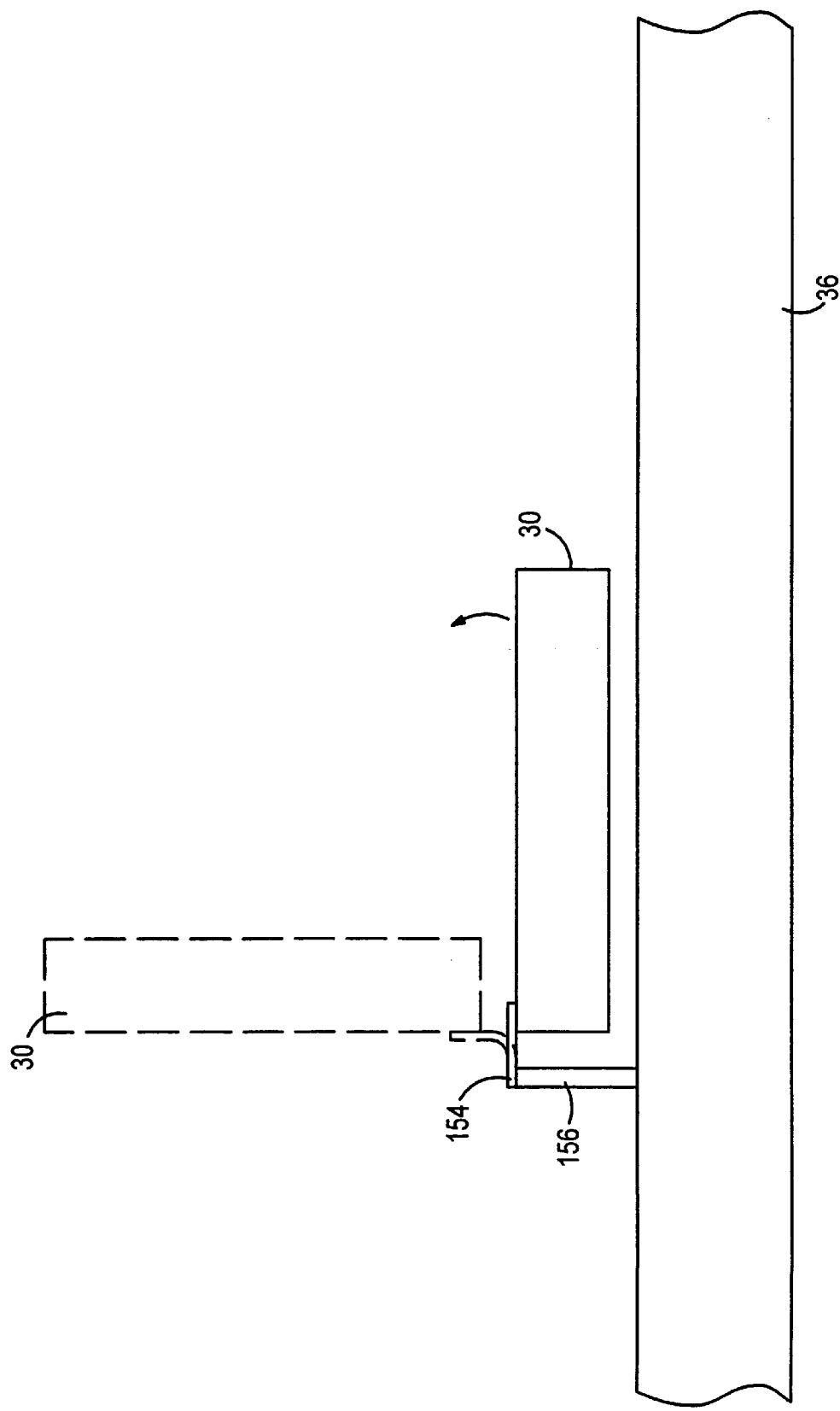
FIG. 18 is a diagram of a mirror pivoting mechanism in accordance with the invention.

The switching devices 28 and 136 may be structurally modified without affecting the overall operation of the devices. As an example, the mirror pivoting mechanism, i.e., the pivoting strip 42, may be modified, as shown in FIG. 18. In this modified version of the mirror pivoting mechanism, a pivoting strip 154 is attached to the upper surface of the micromirror 30, instead of the side or lower surface of the micromirror. The pivoting strip 154 is also attached to a support structure 156 that is affixed to the stator 36. The pivoting strip 154 allows the micromirror to pivot to the reflective orientation, as illustrated by the dotted outline of the micromirror. If the pivoting strip 154 and the support structure are implemented in the switching device 28, the support structure would be positioned on the stator such that it would be situated within the opening 44 of the translator 34.

Although the switching devices 28 and 136 have been described as being components of the optical switch 10, other applications of the switching devices 28 and 136 are contemplated. In both devices, the micromirror 30 can be incrementally pivoted by short lateral displacement of the translator 34 or 140. Consequently, an optical beam may be reflected to a number of different destinations by these switching devices. This feature allows the switching devices to function as beam steering devices. For example, the switching devices may be utilized to lock a signal beam to a receiver, to scatter a laser beam for UPC scanning, or to steer optical signals for demultiplexing.

Figure 19:
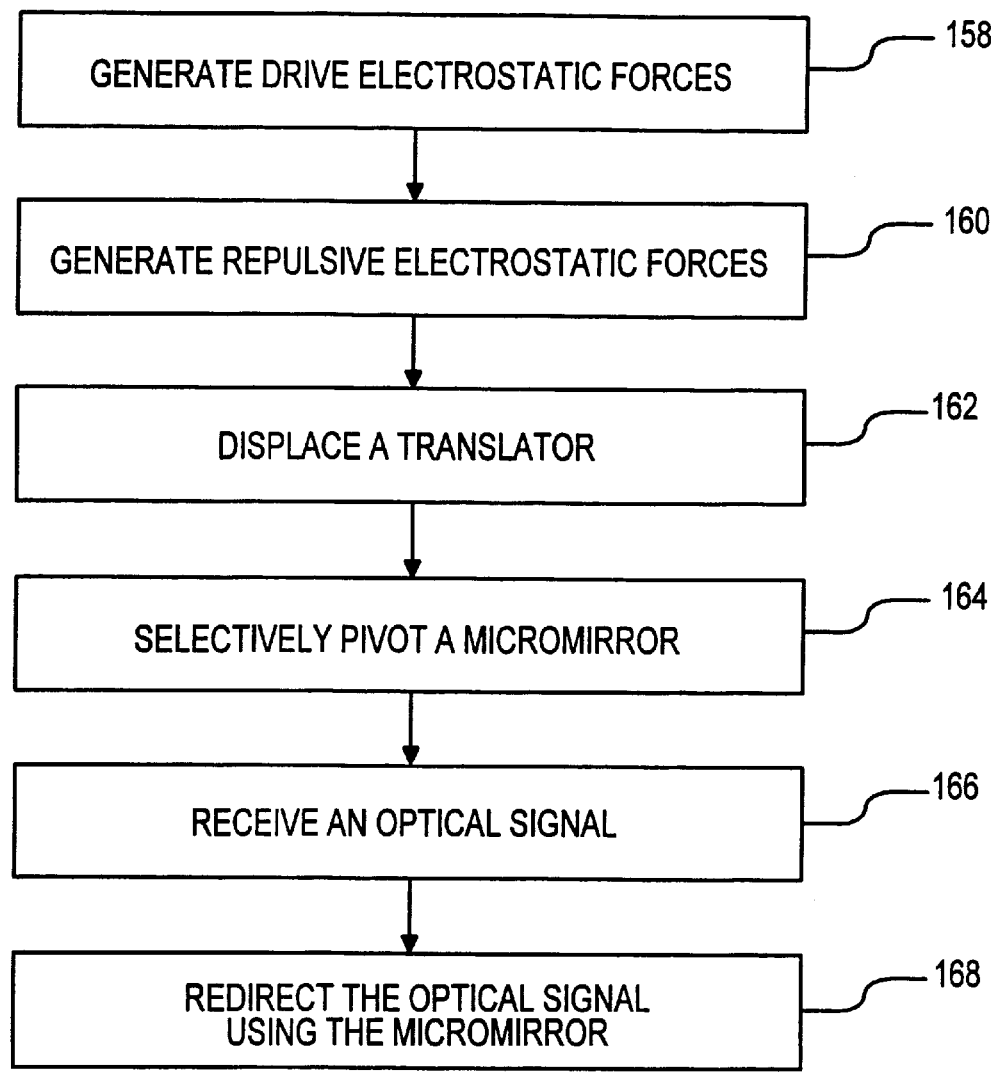
FIG. 19 is a flow diagram of a method of steering optical signals using an electrostatic actuator in accordance with the present invention.

A method of steering optical beams using a switching device in accordance with the invention will be described with reference to FIG. 19. At step 158, drive electrostatic forces are generated between a translator and a stator of the switching device. The translator and the stator define an electrostatic actuator. Next, at step 160, repulsive electrostatic forces that are normal to the opposing surfaces of the translator and the stator are generated. The repulsive forces operate to negate any induced attractive forces between the translator and the stator. At step 162, the translator is laterally displaced by changing the drive electrostatic forces. A micromirror of the switching device is then selectively pivoted by the displaced translator to the reflective orientation from the non-reflective orientation, at step 164. Preferably, the translator is physically coupled to the micromirror such that lateral displacement of the translator mechanically pivots the micromirror. At step 166, an optical signal from a first optical fiber is received by the switching device. The optical signal propagates toward the micromirror. At step 168, the optical signal is reflected by the micromirror, thereby redirecting the optical signal to a second optical fiber.

What is claimed is:
1. An optical micromachine for steering optical beams comprising:
    a reflective element having a reflecting surface to redirect an optical beam from an original direction to a second direction; and
    a surface electrostatic actuator operatively coupled to said reflective element to selectively manipulate said reflective element in a path of said optical beam, said surface electrostatic actuator including a movable member that can be displaced with respect to a stationary member of said electrostatic actuator in response to electrostatic forces, said movable member having a first plurality of electrodes on a first surface of said movable member, said stationary member having a second plurality of electrodes on a second surface of said stationary member that opposes said first surface of said movable member, said first and second pluralities of said electrodes configured to generate said electrostatic forces to laterally displace said movable member in a direction generally parallel to said first and second surfaces, said movable member being mechanically attached to said reflective element such that said reflective element is selectively manipulated in said path of said optical beam by displacement of said movable member.
2. The micromachine of claim 1 wherein said reflective element is configured to be pivotable by said surface electrostatic actuator to at least a relaxed orientation and a reflective orientation such that said optical beam is redirected to said second direction when said reflective element is positioned in said reflective orientation.
3. The micromachine of claim 2 wherein said reflective element is configured to be pivoted between an initial orientation in which said reflecting surface of said reflective element is generally parallel to a propagation path of said optical beam and a final orientation in which said reflecting surface of said reflective element is generally perpendicular to said propagation path of said optical beam, said initial orientation being said relaxed orientation and said final orientation being said reflective orientation.
4. The micromachine of claim 2 wherein said reflective element is partially affixed to said stationary member such that said reflective element is able to pivot about one side of said reflective element in response to said displacement of said movable member.
5. The micromachine of claim 1 wherein said movable member of said electrostatic actuator is positioned above said stationary member such that a lower surface of said movable member faces an upper surface of said stationary member, said lower surface of said movable member being said first surface of said movable member and said upper surface of said stationary member being said second surface of said stationary member.
6. The micromachine of claim 1 wherein said first plurality of said electrodes is positioned on said first surface of said movable member such that a repeat distance associated with said first plurality of said electrodes divided by a gap distance between said first plurality of said electrodes and said second plurality of said electrodes is less than approximately sixteen.
7. The micromachine of claim 1 wherein said electrodes of said first and second pluralities are thin strips of conductive material that are positioned substantially in parallel on said first surface of said movable member and said second surface of said stationary member.
8. The micromachine of claim 1 further comprising a voltage controller that is electrically coupled to said second plurality of said electrodes on said stationary member to selectively vary voltages along said second plurality such that predetermined voltage patterns are established, said predetermined voltage patterns defining said electrostatic forces between said movable member and said stationary member.

9. The micromachine of claim 1 further comprising a voltage source that is electrically coupled to said first plurality of said electrodes on said movable member, said voltage source being configured to apply a repeating spatially alternating voltage pattern to said first plurality of said electrodes.

10. The micromachine of claim 1 further comprising a first plurality of levitator electrodes on said first surface of said movable member and a second plurality of levitator electrodes on said second surface of said stationary member, said levitator electrodes being configured to generate repulsive electrostatic forces between said movable member and said stationary member.

11. The micromachine of claim 1 wherein said movable member includes a plurality of flexures that are attached to said stationary member, said flexures having a structural property to yield to movement of said movable member such that said movable member may be displaced in said direction.

12. A method of steering optical beams using a surface electrostatic actuator comprising steps of:
   receiving an optical beam;
   displacing a movable member of said surface electrostatic actuator in a direction generally parallel to a surface of said movable member facing a stationary member of said surface electrostatic actuator;
   selectively manipulating a reflective element in a path of said optical beam in response to displacement of said movable member of said surface electrostatic actuator in said direction generally parallel to said surface of said movable member facing said stationary member of said surface electrostatic actuator; and
   redirecting said optical beam by reflecting said optical beam from said reflective element to a destination that is at least partially defined by said selective manipulation of said reflective element.

13. The method of claim 12 wherein said step of selectively manipulating said reflective element includes a step of selectively pivoting said reflective element to a particular orientation by said surface electrostatic actuator.

14. The method of claim 13 wherein said step of selectively pivoting said reflective element is a step of selectively pivoting said reflective element by approximately ninety degrees from an initial orientation.

15. The method of claim 13 wherein said step of selectively pivoting said reflective element includes incrementally pivoting said reflective element such that said reflective element makes a predefined angle with respect to said surface of said movable member, said predefi ned angle defining said particular orientation of said reflective element.

16. The method of claim 12 wherein said step of redirecting said optical beam to said destination is a step of redirecting said optical beam to one of a plurality of waveguides, said optical beam being an optical signal.

17. The method of claim 12 wherein said step of displacing said movable member of said surface electrostatic actuator further includes modifying drive electrostatic forces that are generated between said movable member and a stationary member of said electrostatic actuator to displace said movable member.

18. The method of claim 12 further comprising a step of generating repulsive electrostatic forces that are generally normal to opposing surfaces of said movable member and said stationary member to offset induced attractive forces between said movable member and said stationary member of said electrostatic actuator.

19. An optical switch comprising:
   a switching element positioned to selectively direct a received optical signal to one of a plurality of waveguides, said switching element having a reflective surface to reflect said received optical signal to said one of said plurality of said waveguides; and
   an electrostatic actuator operatively coupled to said switching element to selectively manipulate said reflective surface to reflect said received optical signal, said electrostatic actuator including a movable member having a first plurality of electrodes on a first surface of said movable member and a stationary member having a second plurality of electrodes on a second surface of said stationary member to generate electrostatic forces between said movable member and said stationary member, said first surface and second surface being opposed surfaces such that said movable member is able to be displaced in a direction generally parallel to said first and second surfaces, said movable member being mechanically attached to said switching element such that said reflective surface of said switching element is manipulated when said movable member of said electrostatic actuator is displaced.

20. The optical switch of claim 19 wherein said switching element is configured to be pivotable by said electrostatic actuator such that said reflective surface can be orientated to selectively reflect said received optical signal to one of said waveguides.

21. The optical switch of claim 19 wherein said movable member of said electrostatic actuator further includes a plurality of flexures that are attached to said stationary member, said flexures being flexible in said direction generally parallel to said first and second surfaces such that said movable member is able to be displaced in said direction.

22. The optical switch of claim 19 wherein said second plurality of said electrodes on said stationary member is electrically connected to a voltage controller to provide voltages to said second plurality of said electrodes in a voltage pattern, said voltage controller being able to reconfigure said voltage pattern of said second plurality of said electrodes to change said electrostatic forces between said movable member and said stationary member to displace said movable member.

23. The optical switch of claim 19 wherein said first plurality of said electrodes is positioned on said first surface of said movable member such that a repeat distance associated with said first plurality of said electrodes divided by a gap distance between said first plurality of said electrodes and said second plurality of said electrodes is less than approximately sixteen.

24. The optical switch of claim 19 further comprising a voltage source that is electrically coupled to said first plurality of said electrode on said movable member, said voltage source being configured to apply a repeating spatially alternating voltage pattern to said first plurality of said electrodes.

25. The optical switch of claim 19 wherein said movable member further includes a first plurality of levitator electrodes and wherein said stationary member includes a second plurality of levitator electrodes, said levitator electrodes being located on said first and second surfaces to generate repulsive electrostatic forces between said movable member and said stationary member.

* * * * *